(12) United States Patent
Iimori et al.

(10) Patent No.: US 11,365,275 B2
(45) Date of Patent: Jun. 21, 2022

(54) CONTACT LENS COMPOSITION, CONTACT LENS, AND METHOD FOR MANUFACTURING THE SAME

(71) Applicant: Toray Industries, Inc., Tokyo (JP)

(72) Inventors: Hirokazu Iimori, Otsu (JP); Masataka Nakamura, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 322 days.

(21) Appl. No.: 16/611,959

(22) PCT Filed: May 10, 2018

(86) PCT No.: PCT/JP2018/018102
§ 371 (c)(1),
(2) Date: Nov. 8, 2019

(87) PCT Pub. No.: WO2018/212063
PCT Pub. Date: Nov. 22, 2018

(65) Prior Publication Data
US 2021/0147602 A1    May 20, 2021

(30) Foreign Application Priority Data

May 19, 2017  (JP) .............................. JP2017-099489
Oct. 19, 2017 (JP) .............................. JP2017-202349

(51) Int. Cl.
*C08G 77/20*      (2006.01)
*C08F 290/06*     (2006.01)
(Continued)

(52) U.S. Cl.
CPC .......... *C08F 290/068* (2013.01); *C08G 77/20* (2013.01); *G02B 1/043* (2013.01);
(Continued)

(58) Field of Classification Search
None
See application file for complete search history.

(56) References Cited

U.S. PATENT DOCUMENTS 5,157,093 A * 10/1992 Harisiades ............ C08F 290/10
522/89
5,444,106 A *  8/1995 Zhou ........................ A61L 27/18
523/105
(Continued)

FOREIGN PATENT DOCUMENTS

EP      2955207 A1    12/2015
JP      06508657 A    9/1994
(Continued)

OTHER PUBLICATIONS

Extended European Search Report for European Application No. 18 801 754.5, dated Feb. 2, 2021 8 pages.
(Continued)

*Primary Examiner* — Peter A Salamon
(74) *Attorney, Agent, or Firm* — RatnerPrestia

(57) ABSTRACT

The present invention provides a contact lens composition that is polymerizable in a mold and that can easily be peeled from a mold, a cured material of the contact lens composition, a contact lens in which the cured material of the contact lens composition is disposed in at least a center part thereof, and a method for manufacturing the contact lens. This contact lens composition contains (a) a polymerizable cross-linking agent having a multi-ring alicyclic hydrocarbon structure and (b) silicone having a radical polymerizable group.

13 Claims, 4 Drawing Sheets

(51) Int. Cl.
- *G02B 1/04* (2006.01)
- *B29D 11/00* (2006.01)
- *B29K 83/00* (2006.01)
- *B29K 105/00* (2006.01)

(52) U.S. Cl.
CPC .... *B29D 11/00038* (2013.01); *B29K 2083/00* (2013.01); *B29K 2105/0061* (2013.01)

(56) References Cited

U.S. PATENT DOCUMENTS

| | | | | |
|---|---|---|---|---|
| 5,962,611 | A * | 10/1999 | Meijs | C08F 290/062 526/247 |
| 6,042,756 | A * | 3/2000 | Muller | B29C 39/12 264/1.36 |
| 7,385,017 | B2 * | 6/2008 | Saito | C08F 290/068 526/279 |
| 2003/0125498 | A1 * | 7/2003 | McCabe | A61L 27/52 528/25 |
| 2004/0046931 | A1 | 3/2004 | Legerton et al. | |
| 2006/0052567 | A1 | 3/2006 | Saito et al. | |
| 2007/0216045 | A1 * | 9/2007 | Francis | B29D 11/00192 264/1.1 |
| 2007/0229758 | A1 * | 10/2007 | Matsuzawa | G02B 1/043 351/159.62 |
| 2008/0174035 | A1 * | 7/2008 | Winterton | G02B 1/043 264/1.36 |
| 2008/0203592 | A1 * | 8/2008 | Qiu | A61P 31/04 264/2.6 |
| 2009/0160074 | A1 * | 6/2009 | Pruitt | G02B 1/043 264/1.36 |
| 2010/0120938 | A1 * | 5/2010 | Phelan | C08G 77/442 523/107 |
| 2010/0296049 | A1 * | 11/2010 | Justynska | C08F 283/124 351/159.33 |
| 2011/0063567 | A1 * | 3/2011 | Domschke | C08G 77/388 351/159.34 |
| 2011/0134387 | A1 * | 6/2011 | Samuel | G02B 1/043 351/159.33 |
| 2012/0130007 | A1 * | 5/2012 | Jaunky | C08F 220/1804 524/544 |
| 2012/0165414 | A1 * | 6/2012 | Jaunky | C08G 65/22 514/772.4 |
| 2012/0169994 | A1 | 7/2012 | Matsushita et al. | |
| 2014/0285765 | A1 | 9/2014 | Fujisawa et al. | |
| 2014/0377327 | A1 * | 12/2014 | Davis | A61K 9/0051 424/429 |
| 2015/0133619 | A1 * | 5/2015 | Kudo | G02B 1/04 526/279 |
| 2015/0219927 | A1 * | 8/2015 | White | B29D 11/00048 351/159.04 |
| 2015/0361114 | A1 * | 12/2015 | Kudo | C07F 7/0838 526/247 |
| 2016/0031915 | A1 * | 2/2016 | Srivastava | C08L 83/04 525/475 |
| 2018/0180903 | A1 | 6/2018 | Hansen et al. | |

FOREIGN PATENT DOCUMENTS

| | | |
|---|---|---|
| JP | 10513125 A | 12/1998 |
| JP | 11503182 A | 3/1999 |
| JP | 2004085501 A1 | 10/2004 |
| JP | 2007524870 A | 8/2007 |
| JP | 2009530686 A | 8/2009 |
| JP | 2013205845 A | 10/2013 |
| JP | 2014181255 A | 9/2014 |
| JP | 2014198792 A | 10/2014 |
| JP | 2015140393 A | 8/2015 |
| JP | 2016524589 A | 8/2016 |
| WO | 2011004800 A1 | 1/2011 |
| WO | 2013024857 A1 | 2/2013 |

OTHER PUBLICATIONS

International Search Report and Written Opinion for International Application No. PCT/JP2018/018102, dated Jul. 24, 2018, 8 pages.

* cited by examiner

[Fig 1]
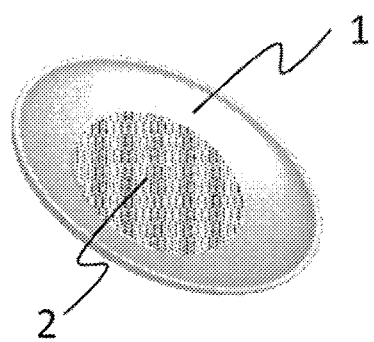
[Fig 2]
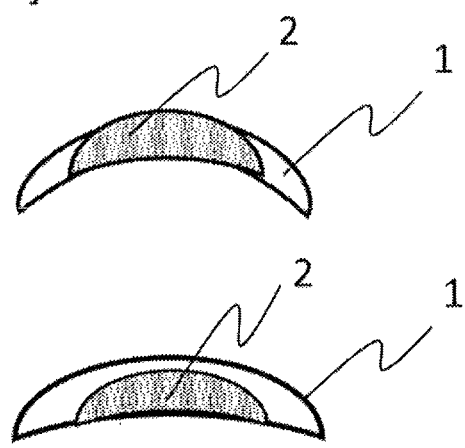
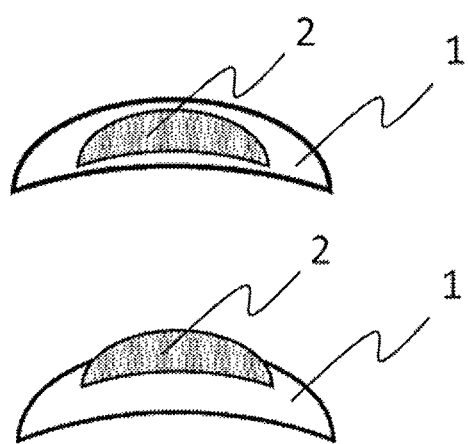

[Fig 3]
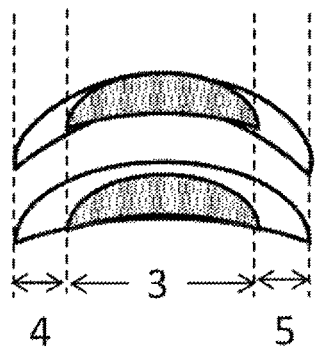
[Fig 4]
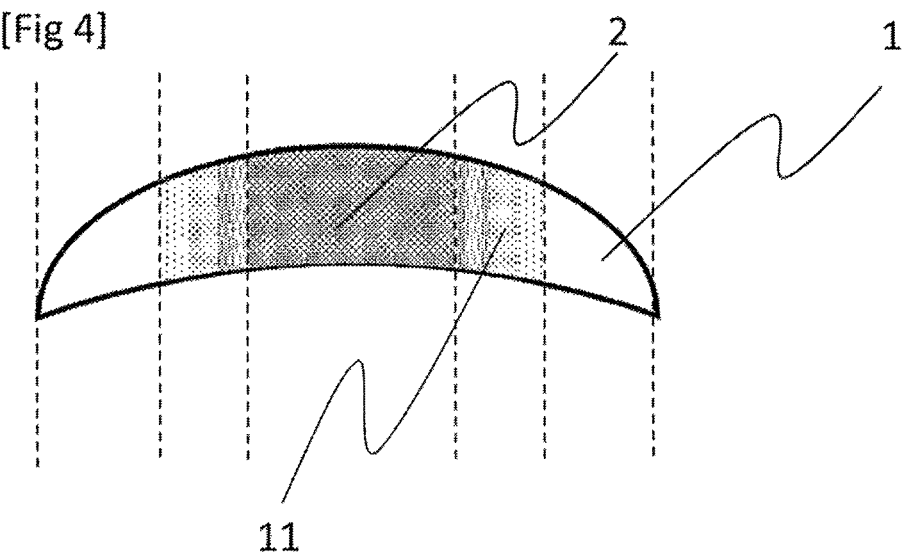

[Fig 5]
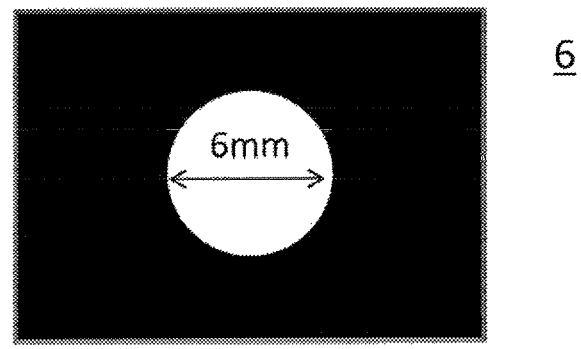
[Fig 6]
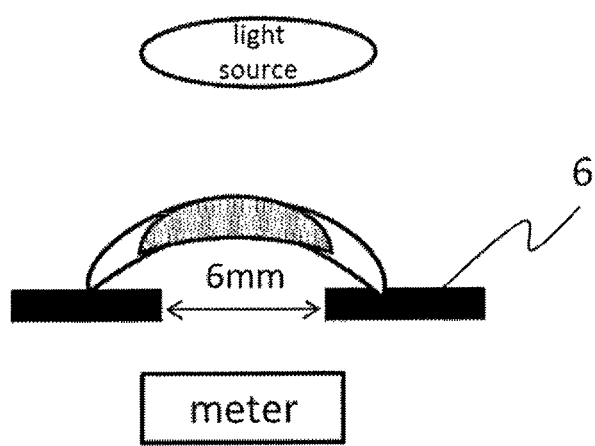

[Fig 7]
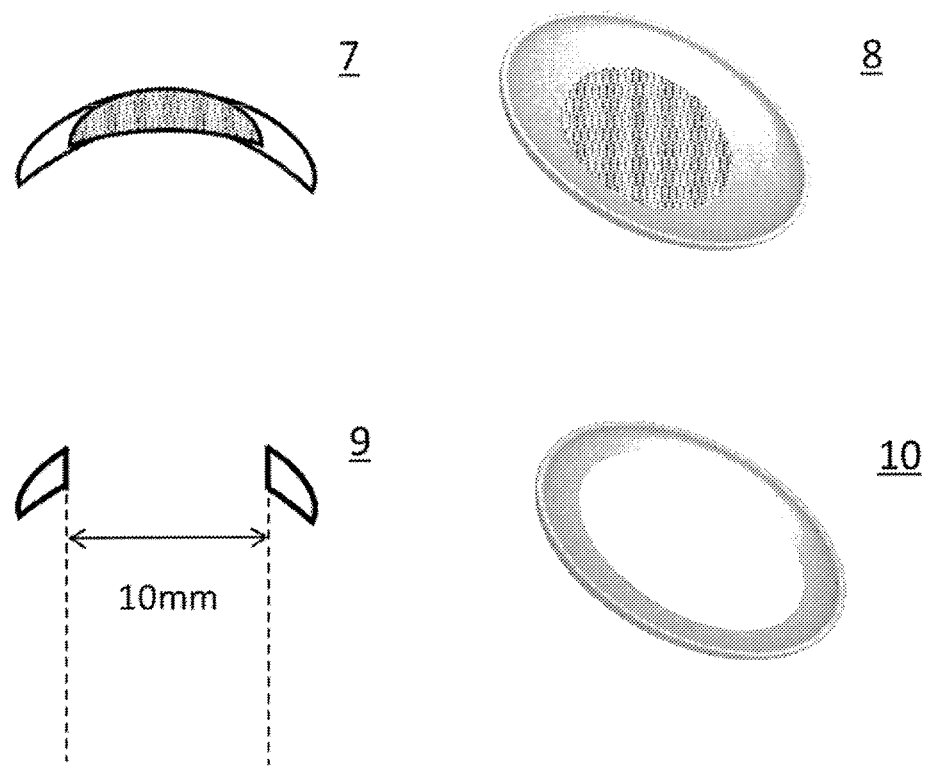

CONTACT LENS COMPOSITION, CONTACT LENS, AND METHOD FOR MANUFACTURING THE SAME

CROSS REFERENCE TO RELATED APPLICATIONS

This is the U.S. National Phase application of PCT/JP2018/018102, filed May 10, 2018, which claims priority to Japanese Patent Application No. 2017-099489, filed May 19, 2017 and Japanese Patent Application No. 2017-202349, filed Oct. 19, 2017, the disclosures of each of these applications being incorporated herein by reference in their entireties for all purposes.

FIELD OF THE INVENTION

The present invention relates to a contact lens composition, a cured contact lens composition, a contact lens, and a method for manufacturing a contact lens.

BACKGROUND OF THE INVENTION

In the field of contact lenses, hard contact lenses made from hard materials and soft contact lenses made from soft hydrous materials (hydrogels) have been marketed. Since hard contact lenses are hard, they are stable in lens shape and have high capability in vision correction including astigmatism correction. However, since the hard lens moves on the eyeball, the lens edge causes friction with the eyeball to cause discomfort, and some people cannot stand wearing the hard contact lenses. Meanwhile, since soft contact lenses are soft and are hydrous similarly to eyeballs, many people feel good wear comfort. However, since the soft contact lenses are made from soft materials, some wearers who produce little lacrimal fluid may be deteriorated in visibility due to drying of the eyeball surface or may feel discomfort.

Since the hard contact lenses are formed by grinding a cylindrical hard material for hard contact lenses into a lens shape, a large amount of shavings are generated and increase the manufacturing cost. For this reason, the hard contact lenses are marketed on the premise that one pair of lenses are used for one year or more. On the other hand, since the soft contact lenses are formed by polymerizing a liquid raw material in a mold, only a small part of the raw material is discarded, and the soft contact lenses are low in manufacturing cost. Therefore, disposable contact lenses that are replaced every day, every two weeks, or every month are marketed.

It has been difficult with conventional techniques to develop a contact lens that provides good wear comfort and also has particularly high capability in vision correction including astigmatism correction. Therefore, so-called hybrid contact lenses have been studied and known, in which a hard material that has low moisture content is positioned at the central visual field portion, and a soft material that provides good wear comfort and has high moisture content is positioned at the periphery that is the non-visual field portion in contact with the eye (see, for example, Patent Documents 1 and 2).

Examples of a method for manufacturing such hybrid contact lens include the following method. Specifically, first, a general hard contact lens composition is subjected to polymerization or the like to produce a cylindrical cured product, and the cured product is cut into a lens shape having a center with a high elastic modulus. Then, the obtained lens-shaped product is joined to a separately produced hydrogel material positioned at the periphery.

PATENT DOCUMENTS

Patent Document 1: Japanese Patent Laid-open Publication No. 2013-205845
Patent Document 2: Published Japanese Translation No. 2007-524870

SUMMARY OF THE INVENTION

However, the conventional method for manufacturing a hybrid contact lens as disclosed in Patent Document 1 is a method of joining a cured product of a general hard contact lens composition to a hydrogel material. This method has problems that the process is complicated, and that a large amount of shavings are generated when cutting and processing a cured product into a lens shape.

As for a general disposable soft contact lens, a polymerization reaction is performed in a disposable plastic mold generally called a mold in order to reduce the manufacturing cost. When peeling off the soft contact lens from the mold, the soft contact lens is swollen by immersion in an alcohol aqueous solution and heating. For swelling the hydrogel, an alcohol aqueous solution is generally used as a peeling solution.

It is conceivable to apply the above-mentioned method for manufacturing a soft contact lens to the manufacture of a hybrid contact lens in order to simplify the manufacturing process and to reduce the manufacturing cost.

However, such attempt is accompanied by the following difficulties. Specifically, a cured product of a general hard contact lens composition does not swell easily in an alcohol aqueous solution. In addition, the alcohol aqueous solution hardly penetrates into the contact portion between the mold and the cured product. Therefore, it is generally difficult to peel off the hard contact lens from the mold. In particular, when a hybrid contact lens including the center made from a hard material and the periphery made from a soft material is manufactured by polymerization in one mold, the force tends to be concentrated at the boundary between the hard material and the soft material due to a difference in ease of swelling with an alcohol aqueous solution between the hard material and the soft material, and the contact lens may be broken at the boundary without being peeled off.

In the method of performing a polymerization reaction in a mold using two immiscible contact lens materials as disclosed in Patent Document 2, the two immiscible materials are separated at the lens surface during polymerization, and the lens tends to whiten.

Therefore, it is meaningful to provide a hard contact lens composition that is easy to polymerize in a mold and to peel off from the mold, which is a method for manufacturing a soft contact lens.

Under such circumstances, an object of the present invention is to provide a contact lens composition that can be polymerized in a mold and easily peeled off from the mold. Another object of the present invention is to provide a cured contact lens composition, a contact lens containing the cured contact lens composition positioned in at least a center of the contact lens, and a method for manufacturing the contact lens.

The contact lens composition according to the present invention has the following constitution. More specifically, the contact lens composition according to the present invention is a contact lens composition containing (a) a polymerizable crosslinking agent having a polycyclic alicyclic hydrocarbon structure, and (b) a radical-polymerizable group-containing silicone.

According to the present invention, it is possible to provide a contact lens composition that can be polymerized in a mold and easily peeled off from the mold.

BRIEF DESCRIPTION OF THE DRAWINGS

FIG. 1 A schematic view of a hybrid contact lens.
FIG. 2 Cross-sectional views of the hybrid contact lens.
FIG. 3 A diagram showing the width of a center and the width of a periphery of the hybrid contact lens.
FIG. 4 A schematic view of a hybrid contact lens having a transition section gradually changing from a hard material to a soft material.
FIG. 5 A schematic view of a light shielding plate used in measuring the luminous transmittance of a contact lens.
FIG. 6 A schematic view of measurement of the luminous transmittance of a contact lens.
FIG. 7 Schematic views showing shapes before and after a center of a contact lens is hollowed out.

DETAILED DESCRIPTION OF EMBODIMENTS OF THE INVENTION

The contact lens composition according to the present invention is a contact lens composition containing (a) a polymerizable crosslinking agent having a polycyclic alicyclic hydrocarbon structure, and (b) a radical-polymerizable group-containing silicone.

The contact lens composition according to the present invention contains the polymerizable crosslinking agent (a) having a polycyclic alicyclic hydrocarbon structure. Since the contact lens composition according to the present invention contains the polymerizable crosslinking agent (a) having a polycyclic alicyclic hydrocarbon structure, in comparison with, for example, a polymerizable crosslinking agent having an aromatic hydrocarbon structure, the contact lens composition has an advantage that it provides a cured product having a high Abbe number (that is, having a small chromatic aberration).

The polycyclic alicyclic hydrocarbon structure is a structure in which carbon atoms of an aliphatic hydrocarbon are bonded in a ring shape, and is a structure in which carbon atoms are bonded to form a plurality of rings.

The polycyclic alicyclic hydrocarbon structure is preferably a structure in which a plurality of rings share one or more carbon atoms, and is more preferably a structure in which a plurality of rings share two or more carbon atoms.

The number of carbon atoms that constitute the ring skeleton of the polycyclic alicyclic hydrocarbon structure is preferably 5 to 14, more preferably 7 to 10.

Examples of the polycyclic alicyclic hydrocarbon structure include a bicycloundecane structure, a decahydronaphthalene structure, a norbornane structure, a norbornene structure, an isobornyl structure, a cubane structure, a basketane structure, a housane structure, a spiro ring structure, a tricyclodecane structure, and an adamantane structure. Among them, a bicycloundecane structure, a tricyclodecane structure, and an adamantane structure are preferable from the viewpoint of easy availability, and a tricyclodecane structure is more preferable from the viewpoint that a contact lens having high luminous transmittance is easily obtained.

The present inventors found that polymerization of a contact lens composition containing a polymerizable cross-linking agent having a polycyclic alicyclic hydrocarbon structure in a mold can provide a cured product having a high elastic modulus and facilitates peeling of the cured product from the mold using a peeling solution.

A "polymerizable crosslinking agent" is a compound having two or more polymerizable groups. In general, the polymerizable crosslinking agent is mixed with a polymerization initiator in a solvent, and then provides heat or light that facilitates the initiation reaction of the polymerization initiator to cause a homopolymerization reaction or a copolymerization reaction with another compound having a polymerizable group, and consequently forms a network molecular structure. The polymerization reaction employed may be a chemical reaction such as a radical reaction (preferably, a photoradical reaction), a condensation reaction, and an addition reaction. The polymerizable group is preferably a radical-polymerizable group. The polymerizable group is preferably a group selected from a (meth)acryloyl group, a styryl group, an epoxy group, and a vinyl group, more preferably a radical-polymerizable group selected from a (meth)acryloyl group, a styryl group, and a vinyl group, most preferably a (meth)acryloyl group. Among groups containing a (meth)acryloyl group, a (meth)acryloyloxy group and a (meth)acrylamide group are preferable. Herein, the term "(meth)acryloyl group" is a generic name of a methacryloyl group and an acryloyl group. This also applies to notations such as "(meth)acrylic" and "(meth)acrylate".

It is preferable that the polymerizable crosslinking agent (a) having a polycyclic alicyclic hydrocarbon structure be a polymerizable crosslinking agent having a polycyclic alicyclic hydrocarbon structure represented by a general formula (1), and that A in the general formula (1) be a polycyclic alicyclic hydrocarbon structure represented by a general formula (2) or (3), from the viewpoint that the cured product is easily peeled off from the mold using a peeling solution. Above all, it is particularly preferable that the polymerizable crosslinking agent (a) having a polycyclic alicyclic hydrocarbon structure be a polymerizable crosslinking agent having a polycyclic alicyclic hydrocarbon structure represented by a general formula (7).

[Chemical Formula 1]

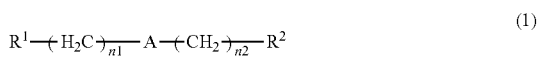

(1)

In the general formula (1), n1 and n2 each represent an integer within a range of 0 to 5, and n1 and n2 in the general formula (1) may be identical or different, and $R^1$ and $R^2$ each independently represent a group selected from the group consisting of a vinyl group, a (meth)acryloyloxy group, a styryl group, and an acrylamide group.

[Chemical Formula 2]

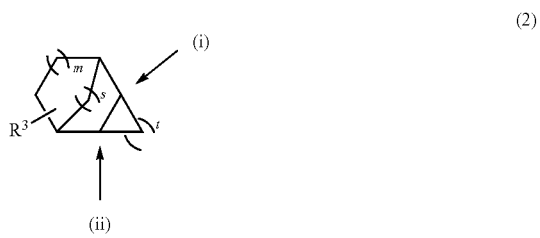

(2)

In the general formula (2), m represents an integer within a range of 1 to 5, t represents an integer within a range of 0 to 5, s represents an integer within a range of 1 to 3, however, when t=0, there is no methylene group in parentheses with subscript t, and a bond between carbon (i) and carbon (ii) in the general formula (2) is a single bond or a double bond, and $R^3$ represents a group selected from the group consisting of a hydrogen group, a hydrocarbon group, an alcohol group, and a carboxylic acid group, number of groups represented by $R^3$ is within a range of 1 to 11, and when the number is 2 or more, the groups each independently represent a group selected from the group consisting of a hydrogen group, a hydrocarbon group, an alcohol group, and a carboxylic acid group.

Herein, among hydroxy groups, an alcoholic hydroxy group is sometimes expressed as an alcohol group, and a phenolic hydroxy group is sometimes expressed as a phenol group. Moreover, a carboxy group is sometimes expressed as a carboxylic acid group. Here, the alcoholic hydroxy group is a hydroxy group bonded to carbon (sp3 carbon) of an aliphatic hydrocarbon, and the phenolic hydroxy group is a hydroxy group bonded to carbon (sp2 carbon) of an aromatic hydrocarbon.

[Chemical Formula 3]

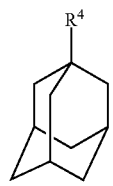

(3)

In the general formula (3), $R^4$ represents a group selected from the group consisting of a hydrogen group, a hydrocarbon group, an alcohol group, and a carboxylic acid group.

[Chemical Formula 4]

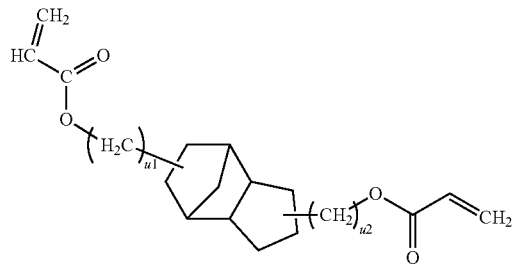

(7)

In the general formula (7), u1 and u2 each represent 0 or 1, and u1 and u2 may be identical or different.

It is preferable for the following reason that the contact lens composition have a content rate of the polymerizable crosslinking agent (a) having a polycyclic alicyclic hydrocarbon structure within a range of 20% by mass or more and 95% by mass or less. A content rate of the polymerizable crosslinking agent (a) of 20% by mass or more is preferable from the viewpoint that the central visual field portion of the contact lens has a high elastic modulus, and that the lacrimal fluid can be stored under the visual field portion of the lens (the space between the visual field portion of the lens and the eyeball). A content rate of the polymerizable crosslinking agent (a) of 95% by mass or less is preferable from the viewpoint that it is possible to avoid a case where the degree of crosslinking is so high that the contact lens is fragile.

It is preferable from the following viewpoint that the polymerizable crosslinking agent (a) having a polycyclic alicyclic hydrocarbon structure have a viscosity within a range of 100 mNs/m$^2$ or more and 500,000 mNs/m$^2$ or less at 25° C.

A viscosity of the polymerizable crosslinking agent (a) of 100 mNs/m$^2$ or more is preferable from the viewpoint that in the production of a contact lens by curing the contact lens composition according to the present invention and, for example, a hydrogel composition as a soft material simultaneously in one mold (this process will be described later as a "single mold polymerization method"), the contact lens composition according to the present invention and the hydrogel composition hardly mix with each other, and it is possible to increase the elastic modulus of the center of the obtained contact lens. On the other hand, a viscosity of the polymerizable crosslinking agent (a) of 500,000 mNs/m$^2$ or less is preferable from the viewpoint that the polymerizable crosslinking agent (a) is easy to handle. The unit "mNs/m$^2$" is synonymous with "mPa·s".

The polymerizable crosslinking agent (a) having a polycyclic alicyclic hydrocarbon structure is preferably liquid because if it is solid, the polymerizable crosslinking agent is likely to precipitate in the contact lens composition during the polymerization into a lens to cause whitening.

The contact lens composition according to the present invention contains the radical-polymerizable group-containing silicone (b).

The "radical-polymerizable group" refers to a group containing a carbon-carbon double bond. Examples of the radical-polymerizable group include a vinyl group, a (meth)acryloyl group, a styryl group, and an acrylamide group. The radical-polymerizable group-containing silicone employed may be, for example, a compound having at least one structural unit selected from the group consisting of general formulae (4), (5), and (6). Use of such raw material promotes a uniform sequential polymerization reaction with other radical-polymerizable compounds, improves the transparency, and improves the uniformity of the appearance.

[Chemical Formula 5]

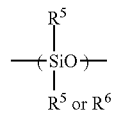

(4)

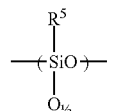

(5)

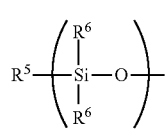

(6)

In the general formulae (4), (5), and (6), $R^5$ is an organic group having an alkenyl group having 2 to 10 carbon atoms, and $R^6$ is hydrogen, an alkyl group having 1 to 6 carbon atoms, an acyl group having 2 to 6 carbon atoms, an organic group having an alkenyl group having 2 to 10 carbon atoms, or an aryl group having 6 to 16 carbon atoms.

Examples of $R^5$ include a vinyl group, an allyl group, a styryl group, a γ-methacryloyloxypropyl group, a γ-acryloyloxypropyl group, a methacryloyl group, an acryloyl group, and a (meth)acryloyloxy group. Two or more of these groups may be used in combination. Moreover, a plurality of groups $R^5$ may be identical or different.

As for $R^6$, any of these alkyl groups and aryl groups May be either an unsubstituted group or a substituted group, and can be selected according to the characteristics of the composition. Moreover, a plurality of groups $R^6$ may be identical or different. Specific examples of the alkyl group and substituted groups thereof include a methyl group, an ethyl group, an n-propyl group, an isopropyl group, an n-butyl group, a t-butyl group, an n-hexyl group, an n-decyl group, a trifluoromethyl group, a 3,3,3-trifluoropropyl group, a 3-glycidoxypropyl group, a 2-(3,4-epoxycyclohexyl)ethyl group, a [(3-ethyl-3-oxetanyl)methoxy]propyl group, a 3-aminopropyl group, a 3-mercaptopropyl group, a 3-isocyanatopropyl group, a 1-(p-hydroxyphenyl)ethyl group, a 2-(p-hydroxyphenyl)ethyl group, and a 4-hydroxy-5-(p-hydroxyphenylcarbonyloxy)pentyl group. Specific examples of the aryl group and substituted groups thereof include a phenyl group, a tolyl group, a p-hydroxyphenyl group, and a naphthyl group. In addition, the radical-polymerizable group-containing silicone employed may be a commercially available product such as X-22-164 series (trade name, Shin-Etsu Chemical Co., Ltd.), X-22-2445 (trade name, Shin-Etsu Chemical Co., Ltd.), and BY16-152C (trade name, Dow Corning Toray Silicone Co., Ltd.).

It is preferable for the following reason that the radical-polymerizable group-containing silicone (b) have a mass average molecular weight within a range of 300 or more and 10,000 or less. A mass average molecular weight of the radical-polymerizable group-containing silicone (b) of 10,000 or less is preferable from the viewpoint that the radical-polymerizable group-containing silicone (b) is easily compatible with the polymerizable crosslinking agent (a) having a polycyclic alicyclic hydrocarbon structure and is capable of forming a transparent hard lens. The mass average molecular weight of the radical-polymerizable group-containing silicone (b) is more preferably 3,000 or less. A mass average molecular weight of the radical-polymerizable group-containing silicone (b) of 300 or more is preferable because the radical-polymerizable group-containing silicone (b) is difficult to mix with the center during the production of the contact lens. The mass average molecular weight of the radical-polymerizable group-containing silicone (b) is more preferably 500 or more.

It is preferable that the radical-polymerizable group-containing silicone (b) have a hydroxy group from the viewpoint that the contact lens composition hardly suffers from surface precipitation due to bleed-out after being cured and stored for a long period of time. More specifically, in general, the radical-polymerizable group-containing silicone (b) is highly hydrophobic in the silicone part, is difficult to mix with other materials, and easily causes bleed-out. Therefore, the radical-polymerizable group-containing silicone (b) may come out on the surface of the contact lens after being cured or after long-term storage to whiten the contact lens and reduce the transparency of the contact lens. The hydroxy group contained in the radical-polymerizable group-containing silicone (b) reduces the hydrophobicity of the silicone, so that it is possible to prevent whitening of the contact lens due to bleed-out. It is preferable that the radical-polymerizable group-containing silicone (b) have a hydroxyl group also from the viewpoint that in the surface hydrophilization treatment of the contact lens by hydrophilic polymer coating intended for enhancing the wettability with the lacrimal fluid, the contact lens base material can be covalently bonded or can interact with the hydrophilic polymer to form a strong coating. Examples of the hydroxy group include an alcohol group, a hydroxy group as a part of a carboxylic acid group, and a phenol group, and an alcohol group is most suitable.

In addition, the contact lens composition according to the present invention may contain a photoradical or thermal radical initiator, or both of them. The photoradical initiator is an initiator that generates radicals by light (including ultraviolet rays and electron beams). The thermal radical initiator is an initiator that generates radicals by heat.

Specific examples of the radical initiator include 2-methyl-[4-(methylthio)phenyl]-2-morpholinopropan-1-one, 2-dimethylamino-2-(4-methylbenzyl)-1-(4-morpholin-4-yl-phenyl)-butan-1-one, 2-benzyl-2-dimethylamino-1-(4-morpholinophenyl)-butanone-1,2,4,6-trimethylbenzoyl phenylphosphine oxide, bis(2,4,6-trimethylbenzoyl)-phenylphosphine oxide, bis(2,6-dimethoxybenzoyl)-(2,4,4-trimethylpentyl)-phosphine oxide, 1-phenyl-1,2-propanedione-2-(o-ethoxycarbonyl)oxime, 1,2-octanedione, 1-[4-(phenylthio)-2-(O-benzoyloxime)], 1-phenyl-1,2-butadione-2-(o-methoxycarbonyl)oxime, 1,3-diphenylpropanetrione-2-(o-ethoxycarbonyl)oxime, ethanone, 1-[9-ethyl-6-(2-methylbenzoyl)-9H-carbazol-3-yl]-,1-(0-acetyloxime), 4,4-bis(dimethylamino)benzophenone, 4,4-bis(diethylamino)benzophenone, p-dimethylamino ethyl benzoate, 2-ethylhexyl-p-dimethylamino benzoate, p-diethylamino ethyl benzoate, diethoxy acetophenone, 2-hydroxy-2-methyl-1-phenylpropan-1-one, benzyl dimethyl ketal, 1-(4-isopropylphenyl)-2-hydroxy-2-methylpropan-1-one, 4-(2-hydroxyethoxy)phenyl-(2-hydroxy-2-propyl)ketone, 1-hydroxycyclohexyl-phenyl ketone, benzoin, benzoin methyl ether, benzoin ethyl ether, benzoin isopropyl ether, benzoin isobutyl ether, benzophenone, methyl o-benzoylbenzoate, 4-phenylbenzophenone, 4,4-dichlorobenzophenone, hydroxybenzophenone, 4-benzoyl-4'-methyl-diphenylsulfide, alkylated benzophenone, 3,3',4,4'-tetra(t-butylperoxycarbonyl)benzophenone, 4-benzoyl-N,N-dimethyl-N-[2-(1-oxo-2-propenyloxy)ethyl]benzene methanaminium bromide, (4-benzoylbenzyl)trimethylammonium chloride, 2-hydroxy-3-(4-benzoylphenoxy)-N,N,N-trimethyl-1-propene aminium chloride monohydrate, 2-isopropylthioxanthone, 2,4-dimethylthioxanthone, 2,4-diethylthioxanthone, 2,4-dichlorothioxanthone, 2-hydroxy-3-(3,4-dimethyl-9-oxo-9H-thioxanthen-2-yloxy)-N,N,N-trimethyl-1-propanaminium chloride, 2,2'-bis(o-chlorophenyl)-4,5,4',5'-tetraphenyl-1,2-biimidazole, 10-butyl-2-chloroacridone, 2-ethylanthraquinone, benzyl, 9,10-phenanthrenequinone, camphorquinone, methylphenylglyoxy ester, η5-cyclopentadienyl-η6-cumenyl-iron(1+-hexafluorophosphate(1−), a diphenyl sulfide derivative, bis(η5-2,4-cyclopentadien-1-yl)-bis(2,6-difluoro-3-(1H-pyrrol-1-yl)-phenyl)titanium, thioxanthone, 2-methylthioxanthone, 2-chlorothioxanthone, 4-benzoyl-4-methylphenylketone, dibenzylketone, fluorenone, 2,3-diethoxyacetophenone, 2,2-dimethoxy-2-phenyl-2-phenylacetophenone, 2-hydroxy-2-methylpropiophenone, p-t-butyldichloroacetophenone, benzylmethoxyethyl acetal, anthraquinone, 2-t-butylanthraquinone, 2-aminoanthraquinone, 3-chloroanthraquinone, anthrone, benzanthrone, dibenzosuberone, methylene anthrone, 4-azidobenzal acetophenone, 2,6-bis(p-azidobenzylidene)cyclohexane, 2,6-bis (p-azidobenzylidene)-4-methylcyclohexanone, naphthalenesulfonyl chloride, quinolinesulfonyl chloride, phenylthioacridone, benzothiazole disulfide, triphenylphosphine, 4,4-bis(dimethylamino)benzophenone, 4,4-bis(diethylamino)benzophenone, ethyl p-dimethylaminobenzoate, 2-ethylhexyl-p-dimethylaminobenzoate, and ethyl p-diethylaminobenzoate. Phosphine oxide initiators such as 2,4,6-trimethylbenzoyl-diphenyl-phosphine oxide and bis(2,4,6-trimethylbenzoyl)-phenylphosphine oxide as well as 1-hydroxy-cyclohexyl-phenyl-ketone that hardly turn yellow when formed into a contact lens are particularly preferable.

It is preferable that the amount of the radical initiator be 0.1% or more and 10% or less with respect to the resin component in the contact lens composition. An amount of 0.1% or more is preferable because the curing reaction by light proceeds well, and an amount of 10% or less is preferable because the radical initiator is prevented from being present as an eluted soluble component.

The contact lens composition according to the present invention may contain a diluent monomer for the purpose of adjusting the viscosity or dissolving solid raw materials. Examples of the diluent monomer include a fluorine-containing low molecular weight compound having a radical-polymerizable group, a (meth)acrylic acid alkyl ester, and a radical-polymerizable compound having a hydrophilic functional group.

Specific examples of the fluorine-containing low molecular weight compound having a radical-polymerizable group include trifluoromethyl (meth)acrylate, trifluoroethyl (meth) acrylate, trifluoropropyl (meth)acrylate, tetrafluoropropyl (meth)acrylate, hexafluoroisopropyl (meth)acrylate, pentafluorobutyl (meth)acrylate, heptafluoropentyl (meth)acrylate, nonafluorohexyl (meth)acrylate, hexafluorobutyl (meth)acrylate, heptafluorobutyl (meth)acrylate, dodecafluoroheptyl (meth)acrylate, hexadecafluorodecyl (meth) acrylate, heptadecafluorodecyl (meth)acrylate, tetrafluoropropyl (meth)acrylate, pentafluoropropyl (meth)acrylate, tetradecafluorooctyl (meth)acrylate, pentadecafluorooctyl (meth)acrylate, and octadecafluorodecyl (meth)acrylate.

Specific examples of the (meth)acrylic acid alkyl ester include methyl (meth)acrylate, ethyl (meth)acrylate, n-propyl (meth)acrylate, n-butyl (meth)acrylate, tert-butyl (meth) acrylate, isobutyl (meth)acrylate, n-hexyl (meth)acrylate, n-octyl (meth)acrylate, 2-ethylhexyl (meth)acrylate, n-heptyl (meth)acrylate, n-nonyl (meth)acrylate, n-decyl (meth) acrylate, isodecyl (meth)acrylate, n-lauryl (meth)acrylate, tridecyl (meth)acrylate, n-dodecyl (meth)acrylate, cyclopentyl (meth)acrylate, cyclohexyl (meth)acrylate, and n-stearyl (meth)acrylate. More preferable examples of the (meth) acrylic acid alkyl ester include n-butyl (meth)acrylate, n-octyl (meth)acrylate, n-lauryl (meth)acrylate, and n-stearyl (meth)acrylate. Among them, (meth)acrylic acid alkyl esters having an alkyl group having 1 to 10 carbon atoms are still more preferable. Too large a number of carbon atoms in the alkyl group is not preferable because the luminous transmittance of the obtained contact lens may be lowered.

Specific examples of the radical-polymerizable compound having a hydrophilic functional group include methacrylic acid, acrylic acid, itaconic acid, 2-hydroxyethyl (meth) acrylate, 2-hydroxypropyl (meth) acrylate, glycerol (meth)acrylate, polyethylene glycol (meth)acrylate, N,N-dimethylacrylamide, N-methylacrylamide, dimethylaminoethyl (meth)acrylate, methylene bis acrylamide, diacetone acrylamide, N-vinylpyrrolidone, N-vinylcaprolactam, N-vinylacetamide, and N-vinyl-N-methylacetamide.

Among these diluent monomers, fluorine-containing low molecular weight compounds having a radical-polymerizable group, such as trifluoromethyl (meth)acrylate, trifluoroethyl (meth)acrylate, trifluoropropyl (meth)acrylate, tetrafluoropropyl (meth) acrylate, hexafluoroisopropyl (meth) acrylate, pentafluorobutyl (meth) acrylate, heptafluoropentyl (meth) acrylate, nonafluorohexyl (meth)acrylate, and hexafluorobutyl (meth)acrylate are preferable from the viewpoint of high oxygen permeability.

The contact lens composition according to the present invention may further contain components such as a UV absorber, a pigment, a coloring agent, a wetting agent, a slip agent, a medicine and a nutritional supplement component, a compatibilizing component, an antibacterial component, and a mold release agent. The contact lens composition may contain any of the above-mentioned components in a non-reactive or copolymerized form.

When the contact lens composition contains a UV absorber, it is possible to protect the eyes of the contact lens wearer from harmful ultraviolet rays. In addition, when the contact lens composition contains a coloring agent, the ophthalmic lens is colored to facilitate identification, and convenience in handling is improved.

The contact lens composition according to the present invention may contain an organic solvent and a surfactant. The organic solvent can adjust the viscosity and surface tension of the contact lens composition. Most of the organic solvent may be removed in a drying step after the application or in a step of removing elutable components after hydrogel formation. Therefore, the content of the organic solvent, if present, in the contact lens may be very small.

It is preferable for the following reason that the contact lens composition according to the present invention have a viscosity within a range of 30 mNs/m$^2$ or more and 500,000 mNs/m$^2$ or less at 25° C. A viscosity of the contact lens composition of 30 mNs/m$^2$ or more at 25° C. is preferable because the soft contact lens composition for the periphery is hardly mixed with the contact lens composition for the center in the single mold polymerization method described later, and the center has a high elastic modulus. If the viscosity is higher than 500,000 mNs/m$^2$, an excessive force is required to join the upper and lower molds together, and the molds may be deformed. Therefore, the viscosity is preferably 500,000 mNs/m$^2$ or less.

A cured contact lens composition according to the present invention is a cured product of the contact lens composition according to the present invention. Since the cured contact lens composition according to the present invention has the polycyclic alicyclic hydrocarbon structure, in comparison with, for example, a polymerizable crosslinking agent having an aromatic hydrocarbon structure, the cured contact lens composition is preferable in that it has a high Abbe number (that is, it has a small chromatic aberration). Moreover, since the cured contact lens composition contains the silicone, the cured product is preferable from the viewpoint that it has oxygen permeability.

It is preferable for the following reason that the cured contact lens composition according to the present invention have a tensile modulus of elasticity within a range of 100 kgf/cm$^2$ or more and 50,000 kgf/cm$^2$ or less. More specifically, the cured contact lens composition according to the present invention preferably has a tensile modulus of elasticity of 100 kgf/cm$^2$ or more from the viewpoint that a hard material contact lens obtained, from the cured contact lens composition has a high tensile modulus of elasticity in the center, and that a large amount of lacrimal fluid can be retained between the lens and the eyeball. In addition, the cured contact lens composition preferably has a tensile modulus of elasticity of 50,000 kgf/cm² or less from the viewpoint that the contact lens is hard to deform and hard to break when a force is applied to the contact lens. In the present invention, for measuring the tensile modulus of elasticity, the contact lens is immersed in phosphate buffered saline for 24 hours or more, then a test piece is produced as quickly as possible, and the test piece is immersed again in phosphate buffered saline for 1 hour or more. Then, the phosphate buffered saline on the surface of the test piece is wiped off with a clean cloth lightly as quickly as possible, and then the tensile modulus of elasticity can be measured as quickly as possible using a tensile tester such as Tensilon.

The contact lens according to the present invention includes the cured contact lens composition according to the present invention positioned in at least a center of the contact lens. Since the cured contact lens composition according to the present invention is positioned in at least the center of the contact lens, the hard material is positioned in the central visual field portion, so that the lens in front of the visual field is not deformed, the contact lens has high capability in vision correction, a large amount of lacrimal fluid can be retained between the lens and the eyeball, and the water on the surface of the eyeball becomes difficult to be lost.

The cured contact lens composition according to the present invention can be used alone to form a hard contact lens. Specifically, the cured contact lens composition has only to be positioned in the center of the contact lens, and another material may be positioned in the non-visual field portion at the periphery. A so-called hybrid contact lens is preferable from the viewpoint of providing excellent wear comfort. The hybrid contact lens is a contact lens in which the cured contact lens composition according to the present invention is positioned at the central visual field portion, and a soft material that provides good wear comfort and has high moisture content is positioned at the periphery that is the non-visual field portion in contact with the eye.

FIG. 1 is a schematic view of a hybrid contact lens. The hybrid contact lens has a contact lens periphery 1 and a contact lens center 2.

FIG. 2 shows cross-sectional views of the hybrid contact lens, and illustrates possible aspects of the contact lens periphery 1 and the contact lens center 2.

FIG. 3 is a diagram showing the width of a center and the width of a periphery of the hybrid contact lens. The total of a part 4 of the width of the hybrid contact lens periphery and a part 5 of the width of the contact lens periphery in a hydrous state of the hybrid contact lens is defined as the width of the contact lens periphery. A width 3 of the contact lens center is preferably 7 mm or more from the viewpoint of securing the visual field, and is preferably 11 mm or less from the viewpoint of easy wearing. The width of the contact lens periphery is preferably 2 mm or more, more preferably 3 mm or more from the viewpoint of stable movement by blink on the eyeball and easy pinching in removal of the contact lens from the eye, and is preferably 8 mm or less from the viewpoint of reducing the entire width to 15 mm or less and easy wearing. In the present invention, the "hydrous state" of the contact lens is defined as a state of the contact lens after being immersed in phosphate buffered saline at 25° C. for 6 hours or more. Alternatively, the "dry state" of the contact lens is defined as a state of the contact lens after being dried with a vacuum dryer at 40° C. for 16 hours or more.

The contact lens center and the contact lens periphery do not have to have a clear boundary between them.

FIG. 4 is a schematic view of a contact lens having a hard material as the contact lens center 2, a soft material as the contact lens periphery 1, and a contact lens composition transition section 11 in which the composition gradually changes from the hard material to the soft material. Since the contact lens has the composition transition section, it is possible to suppress an abrupt change in hardness. As a result, it is possible to prevent stress concentration at the boundary of composition between the contact lens center and the contact lens periphery, and consequent damage or breakage of the contact lens. The width of the transition section is preferably 1 mm or more in order to effectively suppress an abrupt change in hardness, and is preferably 4 mm or less in order to fully utilize the functions of both the center and the periphery. The periphery is preferably made from a material preferably having a tensile modulus of elasticity of 1 kgf/cm² or more and 300 kgf/cm² or less, preferably 1 kgf/cm² or more and 50 kgf/cm² or less in a hydrous state of the periphery. This is because the hybrid contact lens can be removed from the eye without applying a force to the eyeball similarly to the case of a soft contact lens.

It is preferable that the contact lens according to the present invention contain a hydrogel positioned in at least a periphery of the contact lens because the contact lens comes to have high affinity to the eyeball and hardly gives dry feeling when being worn. The hydrogel is more preferably a fluorine material and/or a silicone material from the viewpoint of high oxygen permeability and low possibility of occurrence of skin diseases due to humidity.

The hydrogel used in the present invention can be obtained by curing, with heat or light, a hydrogel composition containing raw materials for forming the hydrogel. The hydrogel composition is not particularly limited as long as it mainly contains a hydrophilic polymerizable raw material and at least one component selected from the group consisting of a polymerization initiator and a polymerization catalyst, but the hydrogel composition preferably contains a polymerizable fluorine material or a polymerizable silicone material so that the hydrogel may have high oxygen permeability and a low elastic modulus.

Specific examples of the usable hydrophilic polymerizable raw material include hydrophilic low molecular weight compounds having a radical-polymerizable group, such as methacrylic acid, acrylic acid, itaconic acid, 2-hydroxyethyl (meth) acrylate, 2-hydroxypropyl (meth) acrylate, glycerol (meth)acrylate, polyethylene glycol (meth)acrylate, N,N-dimethylacrylamide, N-methylacrylamide, dimethylaminoethyl (meth)acrylate, methylene bis acrylamide, diacetone acrylamide, N-vinylpyrrolidone, N-vinylcaprolactam, N-vinylacetamide, and N-vinyl-N-methylacetamide. The moisture content of the hydrogel can be adjusted by adjusting the content rate of the hydrophilic polymerizable raw material.

Specific examples of the polymerizable fluorine material include trifluoromethyl (meth)acrylate, trifluoroethyl (meth) acrylate, trifluoropropyl (meth)acrylate, tetrafluoropropyl (meth) acrylate, hexafluoroisopropyl (meth) acrylate, pentafluorobutyl (meth) acrylate, heptafluoropentyl (meth) acrylate, nonafluorohexyl (meth) acrylate, hexafluorobutyl (meth) acrylate, heptafluorobutyl (meth) acrylate, dodecafluoroheptyl (meth) acrylate, hexadecafluorodecyl (meth) acrylate, heptadecafluorodecyl (meth) acrylate, tetrafluoropropyl (meth) acrylate, pentafluoropropyl (meth) acrylate, tetradecafluorooctyl (meth) acrylate, pentadecafluorooctyl (meth) acrylate, and octadecafluorodecyl (meth) acrylate. Moreover, it is also possible to use a compound obtained by oligomerizing or polymerizing the above-mentioned polymerizable fluorine material as a raw material.

Although the silicone material is not particularly limited, a radical-polymerizable group-containing silicone that reacts with other polymerizable monomers is preferable. More specifically, the silicone material employed may be a silicone raw material having an alkenyl group, that is, a compound having at least one radical-polymerizable group. In other words, a silicone raw material having at least one structural unit selected from the group consisting of the general formulae (4), (5), and (6) may be employed. Use of the silicone raw material promotes a uniform sequential polymerization reaction with other radical-polymerizable compounds during the formation of the hydrogel, improves the transparency, or improves the uniformity of the appearance.

The radical-polymerizable group is preferably a group selected from a (meth)acryloyl group, a styryl group, and a vinyl group, and is more preferably a (meth)acryloyl group. Among groups containing a (meth)acryloyl group, a (meth)acryloyloxy group and a (meth)acrylamide group are preferable. In particular, a γ-(meth)acryloyloxypropyl group is preferably used.

In addition, the radical-polymerizable group-containing silicone raw material employed may be a commercially available product such as FM7726 (manufactured by JNC CORPORATION, mass average molecular weight: 29 kD, number average molecular weight: 26 kD), FM0725 (trade name, JNC CORPORATION), X-22-164 series (trade name, Shin-Etsu Chemical Co., Ltd.), X-22-2445 (trade name, Shin-Etsu Chemical Co., Ltd.), and BY16-152C (trade name, Dow Corning Toray Silicone Co., Ltd.).

In the contact lens according to the present invention, it is preferable that the hydrogel be a cured product of a hydrogel composition, and that the hydrogel composition contain a non-polymerizable solvent, from the viewpoint that excessive swelling of a portion that constitutes the periphery can be suppressed from after the formation of the hydrogel to after the peeling and storage of the contact lens in the contact lens solution, and that breakage of the hybrid contact lens can be suppressed. The non-polymerizable solvent employed may be any of various organic and inorganic solvents. Examples of the non-polymerizable solvent include water; alcohol solvents such as methyl alcohol, ethyl alcohol, normal propyl alcohol, isopropyl alcohol, normal butyl alcohol, isobutyl alcohol, t-butyl alcohol, t-amyl alcohol, tetrahydrolinalool, ethylene glycol, diethylene glycol, triethylene glycol, tetraethylene glycol, and polyethylene glycol; glycol ether solvents such as methyl cellosolve, ethyl cellosolve, isopropyl cellosolve, butyl cellosolve, propylene glycol monomethyl ether, diethylene glycol monomethyl ether, triethylene glycol monomethyl ether, polyethylene glycol monomethyl ether, ethylene glycol dimethyl ether, diethylene glycol dimethyl ether, triethylene glycol dimethyl ether, and polyethylene glycol dimethyl ether; ester solvents such as ethyl acetate, butyl acetate, amyl acetate, ethyl lactate, and methyl benzoate; aliphatic hydrocarbon solvents such as normal hexane, normal heptane, and normal octane; alicyclic hydrocarbon solvents such as cyclohexane and ethyl cyclohexane; ketone solvents such as acetone, methyl ethyl ketone, and methyl isobutyl ketone; aromatic hydrocarbon solvents such as benzene, toluene, and xylene; and petroleum solvents. These solvents may be used singly or in combination of two or more of them.

Furthermore, it is preferable that the non-polymerizable solvent have at least one moiety selected from an ethylene glycol chain, an alcohol group, a carboxylic acid group, and a phenol group because the non-polymerizable solvent may have characteristics close to those of the peeling solution used for peeling off the polymer obtained from the mold described later. As a result, it is possible to minimize abrupt swelling or the like of the resulting polymer, and to prevent breakage or deformation caused by a difference in the swelling ratio between the hard portion formed from the contact lens composition and the soft hydrogel portion at the boundary between the two portions. It is more preferable that the non-polymerizable solvent have an alcohol group. An alcohol group-containing non-polymerizable solvent is similar in characteristics to water among organic solvents, so that it is possible to minimize the shape change during storage of the contact lens with water in the later stage, and it becomes easy to prevent breakage and deformation of the contact lens.

Examples of the alcohol group-containing non-polymerizable solvent include methanol, ethanol, n-propanol, isopropanol, butanol, 2-butanol, 3-methyl-1 butanol, 2-methyl-2-butanol, tert-amyl alcohol, tert-butyl alcohol, and cyclohexanol. In particular, tert-amyl alcohol and tert-butyl alcohol that have a bulky hydrophobic group are preferable because it is possible to suitably mix a hydrophilic polymerizable raw material with a highly hydrophobic polymerizable silicone or fluorine raw material to form a highly transparent hydrogel.

Moreover, it is preferable for the following reason that the non-polymerizable solvent contain a hydrophilic moiety-containing fluorine compound. The hydrophilic moiety means a hydroxy group (an alcohol group or a phenol group), a carboxy group, a silanol group, an amino group, an alkylamino group, a dialkylamino group, a pyrrolidone moiety, an ethylene glycol chain, a propylene glycol chain, an amide group, or a thiol group. The hydrophilic moiety-containing fluorine compound is a non-polymerizable compound and has a highly hydrophobic fluorine moiety, and therefore concentrates, along with the formation of a hydrophilic hydrogel, near the interface between the hydrogel surface and the mold. The hydrophilic moiety-containing fluorine compound then serves as an internal mold release agent and lowers the adhesion of the polymer to the mold. Therefore, the hydrophilic moiety-containing fluorine compound can suppress the breakage of the contact lens at the interface between the hard contact lens composition and the soft contact lens composition in the process of separating the polymer from the mold.

In particular, the hydrophilic moiety in the hydrophilic moiety-containing fluorine compound preferably includes at least one moiety selected from the group consisting of an ethylene glycol chain, an alcohol group, a carboxylic acid group, and a phenol group, and is particularly preferably an alcohol group, from the viewpoint of weak acidity and prevention of side reactions such as a hydrolysis reaction during or after the polymerization reaction.

Examples of the fluorine compound having an ethylene glycol chain as a hydrophilic moiety include MEGAFACE F series such as MEGAFACE F-477 (trade name, DIC Corporation).

Examples of the fluorine compound having an alcohol group as a hydrophilic moiety include trifluoroethanol, pentafluoroalcohol, 6-perfluoroethylhexanol, heptafluorobutyl ethanol, 3-perfluorobutylpropanol, 6-perfluorobutylhexanol, 2-perfluorohexanylethanol, 3-perfluorohexylpropanol, 6-(perfluorohexyl)hexanol, 2,5-di(trifluoromethyl)-3,6-dioxaundecafluorononanol, and nonafluorohexanol.

Examples of the fluorine compound having a carboxylic group as a hydrophilic moiety include trifluoroacetic acid, perfluorooctanoic acid, and pentadecafluorooctanoic acid.

Examples of the fluorine compound having a phenol group include 2-fluorophenol, 4-fluorophenol, 3-trifluorobenzophenol, and 3,5-bis(trifluoromethyl)phenol.

Moreover, it is also preferable that the hydrophilic moiety-containing fluorine compound be a compound represented by a general formula (8) shown below. Use of the compound represented by the general formula (8) is preferable from the viewpoint that the transparency of the lens can be maintained even if the compound remains in the lens.

[Chemical Formula 6]

$$R^7-(CH_2)n3-Y \quad (8)$$

In the general formula (8), $R^7$ represents a fluoroalkyl group having 1 to 20 carbon atoms. Y represents a hydrophilic moiety, and includes at least one group selected from an alcohol group, a carboxy group, and a phenol group. n3 represents an integer within a range of 0 to 10.

Moreover, it is preferable that the hydrophilic moiety-containing fluorine compound have a mass average molecular weight within a range of 50 or more and 1,000 or less. A mass average molecular weight of the hydrophilic moiety-containing fluorine compound within the above-mentioned range is preferable from the viewpoint that the transparency of the lens can be maintained higher even if the compound remains in the lens.

As described above, it is more preferable that the non-polymerizable solvent used in the present invention have a hydroxy group. The hydroxy group may be contained in either of the hydrophilic moiety-containing fluorine compound or another compound that may be contained in the non-polymerizable solvent.

In the contact lens according to the present invention, it is preferable for the following reason that the hydrogel composition have a content rate of the non-polymerizable solvent contained therein within a range of 0.7 or more and 1.5 or less, where the hydrogel has a moisture content of 1 in a hydrous state. A content rate of the non-polymerizable solvent of 0.7 or more is preferable from the viewpoint of minimizing a change in the solvent content of the portion that constitutes the periphery from after the formation of the hydrogel to after the peeling and storage of the contact lens in the contact lens solution. Specifically, when the hydrogel composition is polymerized into a hydrogel, the hydrogel swells due to the non-polymerizable solvent. The hydrogel in such a state is immersed in an aqueous solution containing an organic solvent, and the solvent component contained in the hydrogel is rapidly replaced from the non-polymerizable solvent to water. During this process, suppressing the fluctuation of the content rate of the solvent component, that is, suppressing the abrupt swelling can prevent breakage at the boundary between the hard material portion formed from the contact lens composition and the soft material formed from the hydrogel composition as well as deformation of the soft material. Alternatively, if the content rate of the non-polymerizable solvent is more than 1.5, the hydrogel containing the non-polymerizable solvent becomes fragile immediately after the polymerization and is thus easily broken at the time of peeling. Therefore, a content rate of the non-polymerizable solvent of 1.5 or less is preferable from the viewpoint that the contact lens is hardly broken at the time of peeling and can easily maintain the shape.

The moisture content of the hydrogel used in the present invention is preferably 1% or more from the viewpoint that the surface friction is reduced by the moisture, and is more preferably 20% by mass or more because the hydrogel may have a water path. In addition, the moisture content is preferably 50% or less from the viewpoint that the degree of swelling can be easily controlled and a target dimension can be easily obtained, and is more preferably 35% or less from the viewpoint that dimensional accuracy is easily ensured.

In the following, the measurement of the moisture content of the hydrogel will be described. FIG. 7 shows schematic views showing shapes before and after a center of a contact lens is hollowed out. FIG. 7 shows a cross-sectional view 7 before the center of the contact lens is hollowed out, and an overall view 8 before the center of the contact lens is hollowed out. The center of the contact lens was hollowed out using a leather punch of 10 mm in diameter. FIG. 7 also shows a cross-sectional view 9 after the center of the contact lens is hollowed out, and an overall view 10 after the center of the contact lens is hollowed out. The mass (W1) in a hydrous state and the mass (W2) in a dry state were measured only for the outer periphery remaining after the contact lens center was circularly hollowed out. The moisture content was calculated from the following formula based on the measurement results.

Moisture content [%]=(W1−W2)/W1×100

The method for manufacturing a contact lens according to the present invention includes a step A of polymerizing the contact lens composition in a mold, and a step B of polymerizing a hydrogel composition in the mold, and the hydrogel composition contains a non-polymerizable solvent. Such a manufacturing method enables manufacture of a contact lens having a center made from a hard material and a periphery made from a soft material at low cost.

The mold means a casting mold. The contact lens composition is injected into a cavity in the mold and polymerized to be formed into a contact lens shape, that is, a cured contact lens composition can be formed. The material of a mold member may be a resin, glass, a ceramic material, a metal or the like. In the case where the contact lens composition is subjected to photopolymerization, a resin or glass is preferably used because an optically transparent material is preferable. The mold is preferably made from at least one material selected from the group consisting of polypropylene, a cycloolefin polymer, and polycarbonate from the viewpoint that the material is inexpensive, has optical transparency during the photopolymerization, and does not dissolve in the contact lens composition or the hydrogel composition. Among them, polypropylene is particularly preferable from the viewpoint of ease of molding and low cost.

Then, a specific example of the manufacturing method will be described.

The mold includes two members, that is, an upper mold and a lower mold, and is designed to form a lens shape between the two members joined together. First, a small amount of the contact lens composition for the center is placed on the lower mold member, the lower mold member is joined with the upper mold member, and the contact lens composition for the center is polymerized. Then, the upper mold member is removed, a composition for the periphery, which is different from the contact lens composition described above, preferably a hydrogel composition, is placed on the lower mold, the upper and lower mold members are joined together, and the composition for the periphery is polymerized. The upper and lower molds are separated from each other, and the obtained lens is peeled off from the mold as a desired contact lens. This process is hereinafter referred to as a "double mold polymerization method".

In the method for manufacturing a contact lens according to the present invention, preferably, the steps A and B are performed simultaneously. This manufacturing method can reduce the number of steps and reduce the cost.

Then, a specific example of the manufacturing method according to the preferable aspect will be described.

First, a small amount of the contact lens composition for the center is placed on the lower mold member, and then a different composition for the periphery, preferably a hydrogel composition, is placed on the contact lens composition for the center. The lower mold member is immediately joined with the upper mold, and the outside and the center are simultaneously polymerized. The upper and lower molds are separated from each other, and the obtained lens is peeled off from the mold as a desired contact lens. This process is hereinafter referred to as a "single mold polymerization method".

In the method for manufacturing a contact lens according to the present invention, it is preferable that the non-polymerizable solvent contain a hydrophilic moiety-containing fluorine compound. Suitable aspects of the hydrophilic moiety-containing fluorine compound, the reason therefor, and the like are as described above.

Depending on the shape of the mold member and the properties of the raw material composition, a gasket may be used to impart to the ophthalmic lens a certain thickness and to prevent liquid leakage of the raw material composition filled in the cavity.

In the mold whose cavity is filled with the raw material composition, the raw material composition is subsequently polymerized by being irradiated with active rays such as ultraviolet rays, visible light, or a combination thereof, or heated in an oven, a liquid bath or the like. A method of using two polymerization methods in combination is also employable. Specifically, it is possible to carry out photopolymerization and then heat polymerization, or to carry out heat polymerization and then photopolymerization.

Examples of specific aspects of the photopolymerization include irradiation with light including ultraviolet rays, such as light of a mercury lamp or an ultraviolet lamp (for example, FL15BL, TOSHIBA CORPORATION) for a short time (usually 1 hour or less).

In the case of heat polymerization, conditions of gradually heating the composition from around room temperature to a temperature of 60° C. to 200° C. over several hours to several tens of hours are preferable for maintaining the optical uniformity and quality of the ophthalmic lens and for enhancing reproducibility.

The method of peeling off the obtained polymer from the mold is not particularly limited, but there can be mentioned a method of peeling off the obtained polymer by admixing the obtained polymer with water, an organic solvent, or a peeling solution that is a mixture thereof, and heating the resulting mixture as necessary. Moreover, there is also a method of peeling off the polymer by irradiating the interface with a laser. Among them, the method of admixing the polymer with the peeling solution is preferable from the viewpoint that unreacted residues adhered to the obtained polymer can be simultaneously removed. The method of admixing may be a method of immersing the mold to which the polymer is attached in the peeling solution, a method of placing the peeling solution on the polymer, or the like.

The peeling solution is, among water, an organic solvent, and a mixture thereof, preferably a hydrophilic solvent from the viewpoint that the peeling solution can easily swell the hydrogel and peel off the polymer. More specifically, it is preferable that the method for manufacturing a contact lens according to the present invention further include a step C of admixing polymers produced in the steps A and B with a hydrophilic solvent. Further, the hydrophilic solvent is preferably an alcohol aqueous solution from the viewpoint that the environmental load can be reduced.

An example of a specific peeling method is a method of separating the upper and lower molds from each other, and then immersing the mold to which the polymer is attached in a peeling solution at 50 to 80° C. together with the mold. Alternatively, a peeling solution at 50° C. to 80° C. may be added to the mold to which the polymer is attached.

However, the circumstances differ in the case where a general hard contact lens composition is polymerized in a mold, and then immersed in a peeling solution and heated. Unlike hydrogels and the like generally used in soft contact lenses, a cured product obtained by polymerizing a hard contact lens composition does not swell easily, and the peeling solution hardly penetrates into the gap between the mold and the cured product. Therefore, the cured product is very difficult to peel off. In particular, polymerizing two or more compositions that provide polymers different in hardness in one mold may cause problems. More specifically, when two compositions are placed in one mold and polymerized so that a composition of the hard contact lens is obtained in the center and a composition of the soft contact lens is obtained in the periphery, the periphery of the obtained polymer easily swells by the peeling solution in contrast to the center that is difficult to swell by the peeling solution. Therefore, the force is likely to be concentrated in the vicinity of the boundary between the two compositions, and the contact lens is likely to be broken or deformed in the peeling step.

In this respect, in the first place, the polymerizable crosslinking agent (a) having a polycyclic alicyclic hydrocarbon structure in the present invention is advantageous in making up the composition of the hard contact lens from the viewpoint that the polycyclic alicyclic hydrocarbon moiety has a rigid structure so that the contact lens composition may be a hard composition having a high elastic modulus. In addition, since the polymerizable crosslinking agent (a) having a polycyclic alicyclic hydrocarbon structure has crosslinkability, the polymerizable crosslinking agent (a) also has characteristics of facilitating peeling of the polymer from the mold, because it prevents generation of any adhesive low molecular weight compound derived from any other non-crosslinkable monomer during polymerization in the mold, and is less likely to exhibit adhesion to the mold. The radical-polymerizable group-containing silicone also has an effect of facilitating peeling of the polymer from the mold because it is high in releasability of the silicone and is also less likely to be an adhesive low molecular weight compound. Therefore, use of the contact lens composition according to the present invention enables formation of a hard material contact lens that can be manufactured by polymerization in a mold and is easily peeled off with a peeling solution. Furthermore, use of the contact lens composition according to the present invention in a hard material at the center of a hybrid contact lens can suppress the occurrence of peeling of the center from the periphery at the time the hybrid contact lens is peeled off, and can provide a hybrid contact lens in which a material that has a higher elastic modulus than that of the periphery and has low moisture content is positioned at the central visual field portion, and a soft material that has a low elastic modulus and provides good wear comfort is positioned at the periphery that is the non-visual field portion in contact with the eye.

In the method for manufacturing a contact lens according to the present invention, after the formation of the contact lens shape, it is possible to hydrophilize the surface of the contact lens, reduce the friction, or reduce the adhesion by a layer-by-layer process of coating the surface of the hydrogel alternately with an acidic compound and a basic compound, hydrophilic polymer coating processing, or plasma treatment processing using a fluorine gas or the like.

EXAMPLES

In the following, preferable embodiments of the present invention will be described with reference to examples.

<Synthesis of Radical-Polymerizable Group-Containing Silicone (RSi-1)>

Into a 500-mL three-necked flask, 47.67 g (0.35 mol) of methyltrimethoxysilane, 39.66 g (0.20 mol) of phenyltrimethoxysilane, 26.23 g (0.10 mol) of 3-trimethoxysilylpropylsuccinic acid, 82.04 g (0.35 mol) of γ-acryloyloxypropyltrimethoxysilane, and 180.56 g of diacetone alcohol (hereinafter referred to as "DAA") were charged. While the mixture was immersed in an oil bath at 40° C. with stirring, an aqueous phosphoric acid solution obtained by dissolving 0.401 g of phosphoric acid in 55.8 g of water was added over 10 minutes using a dropping funnel. After stirring at 40° C. for 1 hour, the oil bath temperature was set to 70° C. and the mixture was stirred for 1 hour, and the oil bath was further heated to 115° C. over 30 minutes. One hour after the start of heating, the internal temperature of the solution reached 100° C., and then the solution was heated and stirred for 2 hours (the internal temperature was 100 to 110° C.). During the reaction, total of 120 g of methanol and water as by-products were distilled out. In order to remove the obtained solvent, the solution was concentrated with an evaporator at 60° C. for 3 hours (final pressure: 41 kgf/m$^2$) to a solid content concentration of 98% to produce a radical-polymerizable group-containing silicone (RSi-1). The mass average molecular weight of the obtained radical-polymerizable group-containing silicone was measured by GPC, and was found to be 3,500 (in terms of polystyrene). The solid content concentration of the obtained radical-polymerizable group-containing silicone was calculated as follows. Specifically, 1.0 g of the radical-polymerizable group-containing silicone (RSi-1) after the concentration was weighed out in an aluminum cup, and heated on a hot plate at 200° C. for 30 minutes. Then, the mass of the radical-polymerizable group-containing silicone (RSi-1) was measured, and the solid content concentration thereof was calculated from the following formula.

Solid content concentration [%]=mass after heating [g]×100/1.0

<Synthesis of Radical-Polymerizable Group-Containing Silicone (RSi-2)>

Into a 500-mL three-necked flask, 54.48 g (0.40 mol) of methyltrimethoxysilane, 99.15 g (0.50 mol) of phenyltrimethoxysilane, (2-(3,4-epoxycyclohexyl), 29.04 g (0.10 mol) of 3-methacryloyloxypropyltrimethoxysilane (also referred to as "3-methacryloxypropyltrimethoxysilane"), and 180 g of propylene glycol monomethyl ether (hereinafter sometimes referred to as "PGME") were charged. The mixture was heated to 40° C. in an oil bath with stirring. While the mixture was further stirred, an aqueous phosphoric acid solution obtained by dissolving 0.54 g of phosphoric acid in 55.80 g of water was added over 10 minutes. After stirring at 40° C. for 30 minutes, the oil bath temperature was set to 70° C. and the mixture was stirred for 1 hour, and the oil bath was further heated to 90° C. over 30 minutes. One hour after the start of heating, the internal temperature of the solution reached 85° C., and then the solution was heated and stirred for 2 hours (the internal temperature was 85 to 90° C.) In order to remove the solvent from the obtained radical-polymerizable group-containing silicone, the solution was concentrated with an evaporator at 60° C. for 3 hours (final pressure: 41 kgf/m$^2$) to a solid content concentration of 98% to produce a radical-polymerizable group-containing silicone (RSi-2). The mass average molecular weight of the obtained silicone was 420. The solid content concentration of the obtained radical-polymerizable group-containing silicone was calculated as follows. Specifically, 1.0 g of the radical-polymerizable group-containing silicone (RSi-2) after the concentration was weighed out in an aluminum cup, and heated on a hot plate at 200° C. for 30 minutes. Then, the mass of the radical-polymerizable group-containing silicone (RSi-2) was measured, and the solid content concentration thereof was calculated from the following formula.

Solid content concentration [%]=mass after heating [g]×100/1.0

<Radical-Polymerizable Group-Containing Silicone (RSi-3)>

Into a four-necked flask equipped with a stirrer, a thermometer, a reflux condenser, and a nitrogen gas inlet, 53.4 parts by mass of 2,6-diisocyanatocaproic acid-β-isocyanato ethyl ester, 52 parts by mass of 2-hydroxyethyl methacrylate, and 0.01 parts by mass of di-n-butyltin dilaurate are charged, and the mixture is stirred in a nitrogen atmosphere at 50° C. until the absorption of hydroxy groups disappears in the infrared absorption spectrum. Then, 94.6 parts by mass of both-terminal alcohol-modified polydimethylsiloxane having a mass average molecular weight of 946 was added to the four-necked flask, and the mixture was stirred in a nitrogen atmosphere at 50° C. until the absorption of isocyanate groups disappeared in the infrared absorption spectrum to produce a silicone (RSi-3) having two double bonds at both terminals.

<Synthesis of Silicone (Si-1)>

Into a 500-mL three-necked flask, 54.48 g (0.40 mol) of methyltrimethoxysilane, 99.15 g (0.50 mol) of phenyltrimethoxysilane, 24.64 g (0.10 mol) of (2-(3,4-epoxycyclohexyl)ethyltrimethoxysilane, and 180 g of PGME were charged. The mixture was heated to 40° C. in an oil bath with stirring. While the mixture was further stirred, an aqueous phosphoric acid solution obtained by dissolving 0.54 g of phosphoric acid in 55.80 g of water was added over 10 minutes. After stirring at 40° C. for 30 minutes, the oil bath temperature was set to 70° C. and the mixture was stirred for 1 hour, and the oil bath was further heated to 115° C. over 30 minutes. One hour after the start of heating, the internal temperature of the solution reached 100° C., and then the solution was heated and stirred for 2 hours (the internal temperature was 100 to 110° C.). In order to remove the solvent from the obtained silicone, the solution was concentrated with an evaporator at 60° C. for 3 hours (final pressure: 41 kgf/m$^2$) to a solid content concentration of 98% to produce a silicone (Si-1). The solid content concentration of the obtained silicone was calculated as follows. Specifically, 1.0 g of the silicone (Si-1) after the concentration was weighed out in an aluminum cup, and heated on a hot plate at 200° C. for 30 minutes. Then, the mass of the silicone (Si-1) was measured, and the solid content concentration thereof was calculated from the following formula. Solid content concentration [%]=mass after heating [g]×100/1.0. The mass average molecular weight of the obtained silicone was 2,500.

<Contact Lens Compositions 1 to 15>

The components at the ratios shown in Tables 1 and 2 were mixed and stirred under a yellow light to form a homogeneous solution. The homogeneous solution was then filtered through a polypropylene syringe filter (0.45 μm) to remove insoluble matters, whereby the contact lens compositions 1 to 15 were obtained.

<Preparation of Hydrogel Composition A>

First, 22 parts by mass of 2-methoxyethyl acrylate, 30 parts by mass of dimethylacrylamide, 43 parts by mass of monomethacryloxypropyl-terminated polydimethylsiloxane (MCR-Mil manufactured by Gelest, Inc.), 10 parts by mass of X-22-164A (manufactured by Shin-Etsu Chemical Co., Ltd.), 0.2 parts by mass of bis(2,4,6-trimethylbenzoyl)-phenylphosphine, 0.1 parts by mass of RUVA-93 (manufactured by Otsuka Chemical Co., Ltd.), 0.1 parts by mass of Reactive bule 246, and 30 parts by mass of tert-amyl alcohol as a non-polymerizable solvent were mixed and stirred under a yellow light to form a homogeneous solution. The homogeneous solution was then filtered through a polypropylene syringe filter (0.45 μm) to remove insoluble matters, whereby the hydrogel composition A was obtained.

<Preparation of Hydrogel Composition B>

The hydrogel composition B was prepared in the same manner as in the hydrogel composition A except that 15 parts by mass of tert-amyl alcohol as a non-polymerizable solvent was used.

<Preparation of Hydrogel Composition C>

The hydrogel composition C was prepared in the same manner as in the hydrogel composition A except that 55 parts by mass of tert-amyl alcohol as a non-polymerizable solvent was used.

<Preparation of Hydrogel Composition D>

The hydrogel composition D was prepared in the same manner as in the hydrogel composition A except that instead of 30 parts by mass of tert-amyl alcohol, 29.7 parts by mass of tert-amyl alcohol, and 0.3 parts by mass of nonafluorohexanol that was a non-polymerizable solvent and was a fluorine compound having an alcohol group as a hydrophilic moiety were used.

<Preparation of Hydrogel Composition E>

The hydrogel composition E was prepared in the same manner as in the hydrogel composition A except that instead of 30 parts by mass of tert-amyl alcohol, 29 parts by mass of tert-amyl alcohol, and 1 part by mass of nonafluorohexanol that was a non-polymerizable solvent and was a fluorine compound having an alcohol group as a hydrophilic moiety were used.

<Preparation of Hydrogel Composition F>

The hydrogel composition F was prepared in the same manner as in the hydrogel composition A except that instead of 30 parts by mass of tert-amyl alcohol, 27 parts by mass of tert-amyl alcohol, and 3 parts by mass of nonafluorohexanol that was a non-polymerizable solvent and was a fluorine compound having an alcohol group as a hydrophilic moiety were used.

<Preparation of Hydrogel Composition G>

The hydrogel composition G was prepared in the same manner as in the hydrogel composition A except that instead of 30 parts by mass of tert-amyl alcohol, 29.7 parts by mass of tert-amyl alcohol, and 0.3 parts by mass of MEGAFACE F-477 (trade name, DIC Corporation) that was a non-polymerizable solvent and was a fluorine compound having an ethylene glycol chain as a hydrophilic moiety were used.

<Preparation of Hydrogel Composition H>

The hydrogel composition H was prepared in the same manner as in the hydrogel composition A except that instead of 30 parts by mass of tert-amyl alcohol, 29 parts by mass of tert-amyl alcohol, and 1 part by mass of MEGAFACE F-477 (trade name, DIC Corporation) that was a non-polymerizable solvent and was a fluorine compound having an ethylene glycol chain as a hydrophilic moiety were used.

<Preparation of Hydrogel Composition I>

The hydrogel composition I was prepared in the same manner as in the hydrogel composition A except that instead of 30 parts by mass of tert-amyl alcohol, 27 parts by mass of tert-amyl alcohol, and 3 parts by mass of MEGAFACE F-477 (trade name, DIC Corporation) that was a non-polymerizable solvent and was a fluorine compound having an ethylene glycol chain as a hydrophilic moiety were used.

The abbreviations shown in Tables 1 and 2 are as follows.

MFS-M15 (manufactured by Gelest, Inc., a radical-polymerizable group-containing fluorinated silicone, mass average molecular weight=1,000)

X-22-164AS (manufactured by Shin-Etsu Chemical Co., Ltd., a radical-polymerizable group-containing silicone, mass average molecular weight=900)

X-22-164A (manufactured by Shin-Etsu Chemical Co., Ltd., a radical-polymerizable group-containing silicone, mass average molecular weight=1,920)

BPE-100 (manufactured by Shin Nakamura Chemical Co., Ltd., ethoxylated bisphenol A dimethacrylate, molecular weight=478)

<Preparation of Phosphate Buffered Saline>

In an Erlenmeyer flask, reagents including 16 g of sodium chloride, 0.4 g of potassium chloride, 2.88 g of disodium hydrogen phosphate, and 0.48 g of potassium dihydrogen phosphate, and 2 L of distilled water were weighed. A stirrer was put in the Erlenmeyer flask, and the contents were stirred well. After confirming the dissolution of the reagents, the contents were filtered using a polyethersulfone filter having a pore diameter of 22 μm and a vacuum pump to produce phosphate buffered saline.

Example 1

The contact lens composition 1 and the hydrogel composition A were used to produce a contact lens by the method for producing a contact lens shown below. The contact lens was subjected to various measurements and evaluations. The results are shown in Table 3.

<Method for Producing Contact Lens (I)—Double Mold Polymerization Method>

On the center of a front curve mold (made from polypropylene, a contact lens mold having a diameter of 15 mm), 15 μL of a contact lens composition was weighed out with a capillary micropipette, and a base curve mold (made from polypropylene, a mold having a diameter of 15 mm and a base curve curvature radius of 8.8 mm) was laid on the front curve mold. The molds were irradiated (1.71 mW/cm$^2$ for 10 minutes) using a fluorescent lamp (TOSHIBA CORPORATION, FL-6D, daylight color, 6 W, 4-tube) for polymerization reaction to form a central hard material portion. Then, the base curve mold was once removed, and 85 μL of a hydrogel composition for the periphery was weighed out with a pipette on the front curve mold, and the base curve mold was returned to its original position. The molds were left standing for 10 minutes, and then irradiated (1.71 mW/cm$^2$ for 30 minutes) using a fluorescent lamp (TOSHIBA CORPORATION, FL-6D, daylight color, 6 W, 4-tube) for polymerization reaction. After the polymerization, the base curve mold was removed from the front curve mold, and the material was immersed in a 70 vol % aqueous solution of isopropyl alcohol, sealed, and heated at 60° C. for 3 hours to peel off a molded body having a contact lens shape from the mold. The obtained molded body was immersed in a 50 vol % aqueous solution of isopropyl alcohol for 10 minutes, subsequently immersed in a 30 vol % aqueous solution of isopropyl alcohol for 10 minutes, and then immersed in a large excess of phosphate buffered saline to produce a hybrid contact lens.

<Method for Producing Contact Lens (II)—Single Mold Polymerization Method>

On the center of a front curve mold (made from polypropylene, a contact lens mold having a diameter of 15 mm), 15 µL of a composition (A) was weighed out with a capillary micropipette, and the mold was left standing for 5 minutes. Then, 85 µL of a composition (B) for the periphery was weighed out on the front curve mold. Immediately after that, a base curve mold (made from polypropylene, a mold having a diameter of 15 mm and a base curve curvature radius of 8.8 mm) was laid on the front curve mold. The molds were irradiated (1.71 mW/cm$^2$ for 30 minutes) using a fluorescent lamp (TOSHIBA CORPORATION, FL-6D, daylight color, 6 W, 4-tube) for polymerization reaction. After the polymerization, the base curve mold was removed from the front curve mold, and the material was immersed in 70% isopropyl alcohol, sealed, and heated at 60° C. for 3 hours to peel off a molded body having a contact lens shape from the mold. The obtained molded body was immersed in a 50 vol % aqueous solution of isopropyl alcohol for 10 minutes, subsequently immersed in a 30 vol % aqueous solution of isopropyl alcohol for 10 minutes, and then immersed in a large excess of phosphate buffered saline to produce a molded body, that is, a hybrid contact lens.

(1) Measurement of Tensile Modulus of Elasticity of Center

A contact lens was produced in the same manner as in the production method (II). The center of the contact lens was hollowed out into a circle of 10 mm using a leather punch of 10 mm in diameter. Then, a test piece having a width (minimum width) of 5 mm and a length of 10 mm was cut out using a specified cutting die. The thickness of the test piece was measured using ABC Digimatic Indicator (ID-C112 manufactured by Mitutoyo Corporation), and the test piece was subjected to a tensile test using Tensilon model RTM-100 manufactured by Toyo Baldwin. The tensile modulus of elasticity of the center was measured at a tensile speed of 100 ram/min and a distance between grips (initial) of 2 mm. Herein, the contact lens was immersed in phosphate buffered saline for 24 hours or more, then a test piece was produced as quickly as possible, and the test piece was immersed again in phosphate buffered saline for 1 hour or more. Then, the phosphate buffered saline on the surface of the test piece was wiped off with a clean cloth lightly as quickly as possible, and then the tensile modulus of elasticity was measured as quickly as possible using a tensile tester such as Tensilon.

(2) Measurement of Tensile Modulus of Elasticity of Periphery

A contact lens was produced by the production method (II). First, the center of the contact lens was hollowed out into a circle of 10 mm using a leather punch of 10 mm in diameter. FIG. 7 shows schematic views showing shapes before and after the center of the contact lens is hollowed out. An outer periphery 10 after being cut out was cut with a single-edged knife into a test piece having a width of 2 mm. The thickness of the test piece was measured using ABC Digimatic Indicator (ID-C112 manufactured by Mitutoyo Corporation), and the test piece was subjected to a tensile test using model RTM-100 manufactured by Toyo Baldwin. The tensile modulus of elasticity of the periphery was measured at a tensile speed of 100 mm/min and a distance between grips (initial) of 2 mm. Herein, the contact lens was immersed in phosphate buffered saline for 24 hours or more, then a test piece was produced as quickly as possible, and the test piece was immersed again in phosphate buffered saline for 1 hour or more. Then, the phosphate buffered saline on the surface of the test piece was wiped off with a clean cloth lightly as quickly as possible, and then the tensile modulus of elasticity was measured as quickly as possible using a tensile tester such as Tensilon.

(3) Measurement of Viscosity.

The viscosity of the contact lens composition or the polymerizable crosslinking agent having a polycyclic alicyclic hydrocarbon group structure was measured using 1.1 cc of the composition or the crosslinking agent at 25° C. using a viscometer (TVE-25 manufactured by TOKYO KEIKI INC.). The measurement results of the viscosity of the polymerizable crosslinking agents having a polycyclic alicyclic hydrocarbon group structure shown in Tables 1 and 2 are described below.

Dimethylol-tricyclodecane diacrylate, liquid, 170 mNs/m$^2$ 1,5-Dimethacryloyloxy-3-hydroxyadamantane, solid (4) Measurement of Mass Average Molecular Weight of Radical-Polymerizable Group-Containing Silicone and Silicone The mass average molecular weight was measured by GPC (measurement apparatus: HPLC-822GPC (manufactured by Tosoh Corporation)) using columns TSK-Gel Super HM-H and TSKgel-Super H2000 (manufactured by Tosoh Corporation, fluidized bed: tetrahydrofuran), using molecular weight standard substance lipophilic polystyrene for GPC (manufactured by Sigma-Aldrich Japan) as a standard substance.

(5) Number of Broken Contact Lenses after Peeled off from Mold

By each of Method for Producing Contact Lens (I)—Double Mold Polymerization Method and Method for Producing Contact Lens (II)—Single Mold Polymerization Method, 32 contact lenses were produced. Each molded body was peeled off, and then the obtained contact lens was observed. The number of torn and defective contact lenses is shown in Table 3. The smaller the number is, the smaller the number of torn and defective contact lenses, and the results are satisfactory. The number of broken contact lenses is preferably 25 or less, more preferably 12 or less.

(6) Evaluation of Wrinkled Deformation in Periphery with Low Elastic Modulus

By each of Method for Producing Contact Lens (I)—Double Mold Polymerization Method and Method for Producing Contact Lens (II)—Single Mold Polymerization Method, 32 contact lenses were produced. The products were immersed in phosphate buffered saline for 24 hours, and then visually classified according to the following criteria. The number of contact lenses in each class was counted, and the symbol of the class with the largest number of contact lenses was recorded in Table 3. The class (a) is the most defective, and the classes (b), (c), and (d) are better in the ascending order.

(a) There are 10 or more wrinkled deformations.
(b) There are 2 to 9 wrinkled deformations.

(c) There are no wrinkled deformations, but a deformation is observed in a single location.

(d) There are no wrinkled deformations, and the entire lens at the periphery has a uniform shape.

(7) Measurement of Moisture Content of Periphery

Method for Producing Contact Lens (I)

The center of the contact lens was hollowed out using a leather punch of 10 mm in diameter as shown in FIG. 7. The mass (W1) in a hydrous state and the mass (W2) in a dry state were measured only for the outer periphery remaining after the contact lens center was circularly hollowed out. The moisture content was calculated from the following formula based on the measurement results.

Moisture content (%)=$(W_1-W2)/W1$

In the present invention, the "hydrous state" means a state of the contact lens after being immersed in phosphate buffered saline at 25° C. for 6 hours or more. Alternatively, the "dry state" of the contact lens means a state of the contact lens after being dried with a vacuum dryer at 40° C. for 16 hours or more.

(8) Measurement of Luminous Transmittance

The luminous transmittance [%] of the contact lens obtained by Method for Producing Contact Lens (I) for the light transmitted through the contact lens was measured using a color computer (SM color computer MODEL SM-6 manufactured by Suga Test Instruments Co., Ltd.). FIG. 5 is a schematic view of a light shielding plate 6 for measuring the luminous transmittance of a contact lens. FIG. 6 is a schematic view of measurement of the luminous transmittance of a contact lens. As shown in FIG. 6, the light shielding plate 6 whose center is hollowed out into a circle of 6 mm is positioned between a light source and a meter shown in FIG. 6. First, the data of luminous transmittance with no contact lens was measured. The data was defined as a luminous transmittance of 100%. Then, the data of luminous transmittance with a contact lens was measured. The closer the value is to 100%, the higher the luminous transmittance is and the higher the transparency is, and the contact lens is satisfactory.

Examples 2 to 10 and Comparative Examples 1 to 6

Examples 2 to 10 and Comparative Examples 1 to 6 were carried out in the same manner as in Example 1 except that the contact lens compositions and the hydrogel compositions as shown in Tables 3 to 5 were used, and the results are shown in Tables 3 to 5.

Examples 11 to 17

A hybrid contact lens was produced in the same manner as in Example 1 according to Method for Producing Contact Lens (I) using the contact lens compositions and the hydrogel compositions as shown in Tables 4 and 5.

Measurements were performed in the same manner as in Example 1 for (5) Number of Broken Contact Lenses after Peeled off from Mold, (6) Evaluation of Wrinkled Deformation in Periphery with Low Elastic Modulus, (7) Measurement of Moisture Content of Periphery, and (8) Measurement of Luminous Transmittance, and the results are shown in Tables 4 and 5.

(9) Process Yield in Separation from Mold

In Method for Producing Contact Lens (I), the base curve mold was removed from the front curve mold, and then the number of broken polymers having a lens shape (breakages) was counted. The process yield was determined by the following formula. The closer the value is to 100%, the higher the process yield is, and the contact lens is satisfactory.

(Process yield in separation from mold)[%]=number of broken polymers(breakages)×100/32

This step is followed by a step of peeling off from the mold, and (5) Number of Broken Contact Lenses after Peeled off from Mold includes (9) Number of Broken Contact Lenses in Step of Separation from Mold.

TABLE 1

| Contact lens composition | Crosslinking agent | | Oligomer | | | Viscosity of composition [mNs/m$^2$] | Elastic modulus of cured product [kgf/cm$^2$] |
|---|---|---|---|---|---|---|---|
| | Polymerizable crosslinking agent having polycyclic alicyclic hydrocarbon structure [parts by mass] | Other crosslinking agents | Radical-polymerizable group-containing silicone [parts by mass] (mass average molecular weight) | Other silicones | Other polymerizable monomer raw materials | | |
| Composition 1 | Dimethylol-tricyclodecane diacrylate [60] | | RSi-1 [30] (3500) | | 2,2,2-Trifluoroethyl acrylate [10] | 135 | 389 |
| Composition 2 | Dimethylol-tricyclodecane diacrylate [15] | | RSi-1 [75] (3500) | | 2,2,2-Trifluoroethyl acrylate [10] | 1451 | 540 |
| Composition 3 | Dimethylol-tricyclodecane diacrylate [35] | | RSi-1 [55] (3500) | | 2,2,2-Trifluoroethyl acrylate [10] | 315 | 480 |
| Composition 4 | Dimethylol-tricyclodecane diacrylate [90] | | RSi-1 [10] (3500) | | | 187 | 293 |
| Composition 5 | Dimethylol-tricyclodecane diacrylate [60] | | RSi-2 [30] (420) | | 2,2,2-Trifluoroethyl acrylate [10] | 35 | 87 |
| Composition 6 | Dimethylol-tricyclodecane diacrylate [15] | | MFS-M15 [75] (900) | | 2,2,2-Trifluoroethyl acrylate [10] | 24 | 90 |
| Composition 7 | Dimethylol-tricyclodecane diacrylate [35] | | MFS-M15 [55] (900) | | 2,2,2-Trifluoroethyl acrylate [10] | 27 | 120 |

TABLE 1-continued

| Contact lens composition | Crosslinking agent | | Oligomer | | Other polymerizable monomer raw materials | Viscosity of composition [mNs/m²] | Elastic modulus of cured product [kgf/cm²] |
|---|---|---|---|---|---|---|---|
| | Polymerizable crosslinking agent having polycyclic alicyclic hydrocarbon structure [parts by mass] | Other crosslinking agents | Radical-polymerizable group-containing silicone [parts by mass] (mass average molecular weight) | Other silicones | | | |
| Composition 8 | Dimethylol-tricyclodecane diacrylate [15] | | X-22-164AS [75] (900) | | 2,2,2-Trifluoroethyl acrylate [10] | 10 | 75 |

*All the compositions contain bis(2,4,6-trimethylbenzoyl)-phenylphosphine [0.5] as a photopolymerization initiator

TABLE 2

| Contact lens composition | Crosslinking agent | | Oligomer | |
|---|---|---|---|---|
| | Polymerizable crosslinking agent having polycyclic alicyclic hydrocarbon structure [parts by mass] | Other crosslinking agents | Radical-polymerizable group-containing silicone [parts by mass] (mass average molecular weight) | Other silicones |
| Composition 9 | | | MFS-M15 [55] (900) | |
| Composition 10 | | Cyclohexane dimethanol dimethacrylate [25] | MFS-M15 [55] (900) | |
| Composition 11 | Dimethylol-tricyclodecane diacrylate [35] | | | Si-1 [55] |
| Composition 12 | | BPE-100 [2] | | |
| Composition 13 | | | X-22-164A [60] (1920) | |
| Composition 14 | | | RSi-3 [10] (3500) | |
| Composition 15 | 1,5-Dimethacryloyloxy-3-hydroxyadamantane [15] | | RSi-1 [55] (3500) | |

| Contact lens composition | Other polymerizable monomer raw materials | Viscosity of composition [mNs/m²] | Elastic modulus of cured product [kgf/cm²] |
|---|---|---|---|
| Composition 9 | Norbornene acrylate [35] 2,2,2-Trifluoroethyl acrylate [10] | 19 | 220 |
| Composition 10 | 2,2,2-Trifluoroethyl acrylate [15] | 12 | 88 |
| Composition 11 | 2,2,2-Trifluoroethyl acrylate [10] | 280 | 78 |
| Composition 12 | n-Butyl acrylate [68], 2-ethylhexyl methacrylate [32] | 1 | 1.8 |
| Composition 13 | γ-methacryloxy tricyclo[5.2.1.02,6]decane [30], hydroxypropyl methacrylate [13], | 17 | 25 |
| Composition 14 | Isobornyl methacrylate [3], trimethylolpropane trimethacrylate [0.055] | 28 | 530 |
| Composition 15 | 2,2,2-Trifluoroethyl acrylate [30] | — | 403 |

*All the compositions contain bis(2,4,6-trimethylbenzoyl)-phenylphosphine [0.5] as a photopolymerization initiator

TABLE 3

|  | Example 1 | Example 2 | Example 3 | Example 4 |
| --- | --- | --- | --- | --- |
| Contact lens composition used | Composition 1 | Composition 2 | Composition 3 | Composition 4 |
| Hydrogel composition used | Composition A | Composition A | Composition A | Composition A |
| (1) Elastic modulus of center kgf/cm$^2$ | 320 | 478 | 453 | 242 |
| (2) Elastic modulus of periphery kgf/cm$^2$ | 8 | 10 | 15 | 12 |
| (5)-(I) Number of broken contact lenses after peeled off from mold Method for producing contact lens (I) | 8 | 12 | 15 | 15 |
| (5)-(II) Number of broken contact lenses after peeled off from mold Method for producing contact lens (II) | 1 | 1 | 3 | 4 |
| (6) Evaluation of wrinkled deformation in periphery with low elastic modulus | (d) | (c) | (d) | (d) |
| (7)-(I) Moisture content of periphery with low elastic modulus (%) Method for producing contact lens (I) | 28 | 30 | 30 | 27 |
| (7)-(II) Moisture content of periphery with low elastic modulus (%) Method for producing contact lens (II) | 28 | 27 | 26 | 27 |
| (8) Measurement of luminous transmittance [%] | 82 | 84 | 86 | 84 |
| (9) Process yield in separation from mold [%] | = | = | = | = |

|  | Example 5 | Example 6 | Example 7 | Example 8 |
| --- | --- | --- | --- | --- |
| Contact lens composition used | Composition 5 | Composition 6 | Composition 7 | Composition 8 |
| Hydrogel composition used | Composition A | Composition A | Composition A | Composition A |
| (1) Elastic modulus of center kgf/cm$^2$ | 53 | 88 | 98 | 102 |
| (2) Elastic modulus of periphery kgf/cm$^2$ | 35 | 50 | 57 | 35 |
| (5)-(I) Number of broken contact lenses after peeled off from mold Method for producing contact lens (I) | 20 | 18 | 16 | 20 |
| (5)-(II) Number of broken contact lenses after peeled off from mold Method for producing contact lens (II) | 5 | 7 | 5 | 4 |
| (6) Evaluation of wrinkled deformation in periphery with low elastic modulus | (c) | (c) | (b) | (b) |
| (7)-(I) Moisture content of periphery with low elastic modulus (%) Method for producing contact lens (I) | 27 | 28 | 28 | 27 |
| (7)-(II) Moisture content of periphery with low elastic modulus (%) Method for producing contact lens (II) | 25 | 25 | 24 | 23 |
| (8) Measurement of luminous transmittance [%] | 88 | 65 | 65 | 80 |
| (9) Process yield in separation from mold [%] | 53 | = | = | = |

—: No measurement results because no contact lens was obtained.
=: No evaluation.

TABLE 4

|  | Example 9 | Example 10 | Example 11 | Example 12 |
|---|---|---|---|---|
| Contact lens composition used | Composition 1 | Composition 1 | Composition 5 | Composition 5 |
| Hydrogel composition used | Composition B | Composition C | Composition D | Composition E |
| (1) Elastic modulus of center kgf/cm$^2$ | 458 | 477 | = | = |
| (2) Elastic modulus of periphery kgf/cm$^2$ | 10 | 7 | = | = |
| (5)-(I) Number of broken contact lenses after peeled off from mold Method for producing contact lens (I) | 21 | 22 | 9 | 10 |
| (5)-(II) Number of broken contact lenses after peeled off from mold Method for producing contact lens (II) | 10 | 17 | = | = |
| (6) Evaluation of wrinkled deformation in periphery with low elastic modulus | (c) | (c) | (c) | (c) |
| (7)-(I) Moisture content of periphery with low elastic modulus (%) Method for producing contact lens (I) | 28 | 32 | 28 | 27 |
| (7)-(II) Moisture content of periphery with low elastic modulus (%) Method for producing contact lens (II) | 25 | 28 | = | = |
| (8) Measurement of luminous transmittance | 84 | 84 | 87 | 88 |
| (9) Process yield in separation from mold | = | = | 100 | 100 |

|  | Example 13 | Example 14 | Example 15 | Example 16 |
|---|---|---|---|---|
| Contact lens composition used | Composition 5 | Composition 5 | Composition 5 | Composition 5 |
| Hydrogel composition used | Composition E | Composition G | Composition H | Composition I |
| (1) Elastic modulus of center kgf/cm$^2$ | = | = | = | = |
| (2) Elastic modulus of periphery kgf/cm$^2$ | = | = | = | = |
| (5)-(I) Number of broken contact lenses after peeled off from mold Method for producing contact lens (I) | 11 | 11 | 12 | 15 |
| (5)-(II) Number of broken contact lenses after peeled off from mold Method for producing contact lens (II) | = | = | = | = |
| (6) Evaluation of wrinkled deformation in periphery with low elastic modulus | (c) | (c) | (c) | (c) |
| (7)-(I) Moisture content of periphery with low elastic modulus (%) Method for producing contact lens (I) | 29 | 27 | 30 | 26 |
| (7)-(II) Moisture content of periphery with low elastic modulus (%) Method for producing contact lens (II) | = | = | = | = |
| (8) Measurement of luminous transmittance | 80 | 85 | 72 | 68 |
| (9) Process yield in separation from mold | 100 | 100 | 100 | 88 |

—: No measurement results because no contact lens was obtained.
=: No evaluation.

TABLE 5

|  | Example 17 | Comparative Example 1 | Comparative Example 2 | Comparative Example 3 |
| --- | --- | --- | --- | --- |
| Contact lens composition used | Composition 15 | Composition 9 | Composition 10 | Composition 11 |
| Hydrogel composition used | Composition A | Composition A | Composition A | Composition A |
| (1) Elastic modulus of center kgf/cm$^2$ | 332 | 120 | 40 | 70 |
| (2) Elastic modulus of periphery kgf/cm$^2$ | 16 | 30 | 25 | 45 |
| (5)-(I) Number of broken contact lenses after peeled off from mold Method for producing contact lens (I) | 12 | 30 | 30 | 30 |
| (5)-(II) Number of broken contact lenses after peeled off from mold Method for producing contact lens (II) | = | 32 | 28 | 32 |
| (6) Evaluation of wrinkled deformation in periphery with low elastic modulus | (d) | (a) | (a) | (a) |
| (7)-(I) Moisture content of periphery with low elastic modulus (s) Method for producing contact lens (I) | 27 | 28 | 27 | 25 |
| (7)-(II) Moisture content of periphery with low elastic modulus (%) Method for producing contact lens (II) | = | — | 10 | — |
| (8) Measurement of luminous transmittance | 69 | 68 | 79 | 33 |
| (9) Process yield in separation from mold | = | = | = | = |

|  | Comparative Example 4 | Comparative Example 5 | Comparative Example 6 |
| --- | --- | --- | --- |
| Contact lens composition used | Composition 12 | Composition 13 | Composition 14 |
| Hydrogel composition used | Composition A | Composition A | Composition A |
| (1) Elastic modulus of center kgf/cm$^2$ | 3 | 12 | — |
| (2) Elastic modulus of periphery kgf/cm$^2$ | 3 | 9 | — |
| (5)-(I) Number of broken contact lenses after peeled off from mold Method for producing contact lens (I) | 30 | 31 | 32 |
| (5)-(II) Number of broken contact lenses after peeled off from mold Method for producing contact lens (II) | 27 | 30 | 32 |
| (6) Evaluation of wrinkled deformation in periphery with low elastic modulus | (a) | (a) | — |
| (7)-(I) Moisture content of periphery with low elastic modulus (s) Method for producing contact lens (I) | 27 | 25 | — |
| (7)-(II) Moisture content of periphery with low elastic modulus (%) Method for producing contact lens (II) | 10 | 9 | — |
| (8) Measurement of luminous transmittance | 84 | 82 | — |
| (9) Process yield in separation from mold | = | = | = |

—: No measurement results because no contact lens was obtained.
=: No evaluation.

DESCRIPTION OF REFERENCE SIGNS

1: Contact lens periphery
2: Contact lens center
3: Contact lens center width
4: Part of width of contact lens periphery
5: Part of width of contact lens periphery
6: Light shielding plate
7: Cross-sectional view before center of contact lens is hollowed out
8: Overall view before center of contact lens is hollowed out
9: Cross-sectional view after center of contact lens is hollowed out
10: Overall view after center of contact lens is hollowed out
11: Contact lens composition transition section

The invention claimed is:

1. A contact lens comprising:
a cured contact lens composition positioned in at least a center of the contact lens,
   wherein the cured contact lens composition is a cured product of a contact lens composition,
   wherein the contact lens composition comprises;
      (a) a polymerizable crosslinking agent having a polycyclic alicyclic hydrocarbon structure, and
      (b) a radical-polymerizable group-containing silicone; and
a hydrogel positioned in at least a periphery of the contact lens,
   wherein the hydrogel is a cured product of a hydrogel composition,
   wherein the hydrogel composition contains a non-polymerizable solvent, and
   wherein the non-polymerizable solvent contains a hydrophilic moiety-containing fluorine compound.

2. The contact lens according to claim 1, wherein the polymerizable crosslinking agent (a) having a polycyclic alicyclic hydrocarbon structure is a polymerizable crosslinking agent having a polycyclic alicyclic hydrocarbon structure represented by a general formula (1), and A in the general formula (1) is a polycyclic alicyclic hydrocarbon structure represented by a general formula (2) or (3):

[Chemical Formula 1]

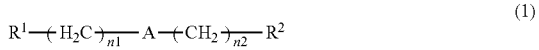

(1)

wherein n1 and n2 each represent an integer within a range of 0 to 5, and n1 and n2 in the general formula (1) may be identical or different, and $R^1$ and $R^2$ each independently represent a group selected from the group consisting of a vinyl group, a (meth)acryloxy group, a styryl group, and an acrylamide group;

[Chemical Formula 2]

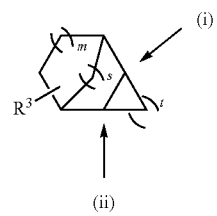

(2)

wherein m represents an integer within a range of 1 to 5, t represents an integer within a range of 0 to 5, s represents an integer within a range of 1 to 3, however, when t=0, there is no methylene group in parentheses with subscript t, and a bond between carbon (i) and carbon (ii) in the general formula (2) is a single bond or a double bond, and $R^3$ represents a group selected from the group consisting of a hydrogen group, a hydrocarbon group, an alcohol group, and a carboxylic acid group, number of groups represented by $R^3$ is within a range of 1 to 11, and when the number is 2 or more, the groups each independently represent a group selected from the group consisting of a hydrogen group, a hydrocarbon group, an alcohol group, and a carboxylic acid group; and

[Chemical Formula 3]

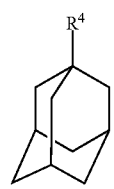

(3)

wherein $R^4$ represents a group selected from the group consisting of a hydrogen group, a hydrocarbon group, an alcohol group, and a carboxylic acid group.

3. The contact lens according to claim 1, wherein the polymerizable crosslinking agent (a) having a polycyclic alicyclic hydrocarbon structure is a polymerizable crosslinking agent having a polycyclic alicyclic hydrocarbon structure represented by a general formula (7):

[Chemical Formula 4]

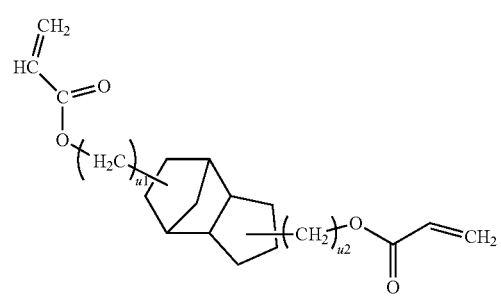

(7)

wherein u1 and u2 each represent 0 or 1, and u1 and u2 may be identical or different.

4. The contact lens according to claim 1, having a content rate of the polymerizable crosslinking agent (a) having a polycyclic alicyclic hydrocarbon structure within a range of 20% by mass or more and 95% by mass or less.

5. The contact lens according to claim 1, having a viscosity within a range of 30 mNs/m$^2$ or more and 500,000 mNs/m$^2$ or less at 25° C.

6. The contact lens according to claim 1, wherein the polymerizable crosslinking agent (a) having a polycyclic alicyclic hydrocarbon structure has a viscosity within a range of 100 mNs/m$^2$ or more and 500,000 mNs/m$^2$ or less at 25° C.

7. The contact lens according to claim 1, wherein the radical-polymerizable group-containing silicone (b) has a mass average molecular weight within a range of 300 or more and 10,000 or less.

8. The contact lens according to claim 1, wherein the cured contact lens composition has a tensile modulus of elasticity within a range of 100 kgf/cm$^2$ or more and 50,000 kgf/cm$^2$ or less.

9. The contact lens according to claim 1, wherein a hydrophilic moiety in the hydrophilic moiety-containing fluorine compound includes at least one moiety selected from the group consisting of an ethylene glycol chain, an alcohol group, a carboxylic acid group, and a phenol group.

10. The contact lens according to claim 1, wherein the hydrophilic moiety-containing fluorine compound is a compound represented by a general formula (8) shown below:

[Chemical Formula 5]

$$R^7\text{—}(CH_2)_{n3}\text{—}Y \tag{8}$$

wherein R$^7$ represents a fluoroalkyl group having 1 to 20 carbon atoms, Y includes at least one group selected from an alcohol group, a carboxylic acid group, and a phenol group, and n3 represents an integer within a range of 0 to 10.

11. A method for manufacturing a contact lens according to claim 1, the method comprising:
a step A of polymerizing the contact lens composition in a mold; and
a step B of polymerizing a hydrogel composition in the mold,
the hydrogel composition containing a non-polymerizable solvent.

12. The method according to claim 11, wherein the steps A and B are performed simultaneously.

13. The method according to claim 11, further comprising a step C of admixing polymers produced in the steps A and B with a hydrophilic solvent.

* * * * *